United States Patent
Ishino et al.

(10) Patent No.: US 11,217,988 B2
(45) Date of Patent: Jan. 4, 2022

(54) OVERVOLTAGE SOURCE DETERMINATION CIRCUIT

(71) Applicant: TDK CORPORATION, Tokyo (JP)

(72) Inventors: Yusuke Ishino, Tokyo (JP); Kengo Tsujimoto, Tokyo (JP)

(73) Assignee: TDK CORPORATION, Tokyo (JP)

(*) Notice: Subject to any disclaimer, the term of this patent is extended or adjusted under 35 U.S.C. 154(b) by 45 days.

(21) Appl. No.: 16/583,932

(22) Filed: Sep. 26, 2019

(65) Prior Publication Data

US 2020/0099215 A1    Mar. 26, 2020

(30) Foreign Application Priority Data

Sep. 26, 2018  (JP) .............................. JP2018-179839

(51) Int. Cl.
*H02H 7/12*    (2006.01)
*H02H 1/00*    (2006.01)
(Continued)

(52) U.S. Cl.
CPC ........ *H02H 7/1213* (2013.01); *H02H 1/0007* (2013.01); *H02H 3/202* (2013.01); *H02M 1/08* (2013.01); *H02M 1/32* (2013.01)

(58) Field of Classification Search
CPC .... H02H 7/1213; H02H 1/0007; H02H 3/042; H02H 3/207; H02H 3/202; H02H 3/033; H02H 3/243; H02M 1/08
See application file for complete search history.

(56) References Cited

U.S. PATENT DOCUMENTS 7,355,829 B2    4/2008  Yamamura et al.
7,477,502 B1*   1/2009  Faulkner ................ H02H 3/033
                                                    361/93.7
(Continued)

FOREIGN PATENT DOCUMENTS

EP    3 048 712 A2    7/2016
JP    H09-284994 A    10/1997
(Continued)

OTHER PUBLICATIONS

Lou, Jiana et al., "High Efficiency High Integration Green Converter", Integrated Circuits, ISIC '09. Proceedings of the 2009 12th International Symposium on, IEEE, Piscataway, NJ, USA, (Dec. 14, 2009), pp. 53-56.

*Primary Examiner* — Kyle J Moody
*Assistant Examiner* — Jye-June Lee
(74) *Attorney, Agent, or Firm* — Oliff PLC

(57) ABSTRACT

A determination circuit including a detection circuitry, a switch controller, and a determination circuitry. The detection circuitry is configured to detect that an overvoltage has occurred in an electric power supply path. The switch controller is configured to turn off a switch when the detection circuitry has detected that the overvoltage has occurred. The determination circuitry is configured to perform a determination operation including determining whether the overvoltage that has occurred is attributed to an electric power conversion circuit or a load, on a basis of one of or both a first voltage of a first path and a second voltage of a second path that are in a period in which the switch is off, the first path coupling the switch and the electric power conversion circuit in the electric power supply path, the second path coupling the switch and the load in the electric power supply path.

11 Claims, 13 Drawing Sheets

(51) Int. Cl.
*H02M 1/08* (2006.01)
*H02H 3/20* (2006.01)
*H02M 1/32* (2007.01)

(56) References Cited

U.S. PATENT DOCUMENTS

| | | | |
|---|---|---|---|
| 10,777,998 B2 * | 9/2020 | Conell | H02H 3/207 |
| 2004/0184208 A1 * | 9/2004 | Liu | H02H 3/207 |
| | | | 361/90 |
| 2014/0253078 A1 * | 9/2014 | Nishio | H02H 3/243 |
| | | | 323/282 |
| 2018/0375320 A1 * | 12/2018 | Ho | H02M 3/156 |
| 2020/0044437 A1 * | 2/2020 | Conell | H02H 3/202 |

FOREIGN PATENT DOCUMENTS

| | | |
|---|---|---|
| JP | H10-004677 A | 1/1998 |
| JP | 2005-086883 A | 3/2005 |

\* cited by examiner

OVERVOLTAGE SOURCE DETERMINATION CIRCUIT

CROSS REFERENCE TO RELATED APPLICATIONS

This application claims the benefit of Japanese Priority Patent Application No. 2018-179839 filed on Sep. 26, 2018, the entire contents of which are incorporated herein by reference.

BACKGROUND

The disclosure relates to a determination circuit, and a power supply apparatus including the determination circuit.

In a power supply apparatus, an overvoltage may occur in an output voltage in some cases. For example, Japanese Unexamined Patent Application Publication No. H09-284994 discloses an overvoltage protection circuit that turns off a switch provided between a direct current to direct current (DC/DC) converter and a load when an overvoltage occurs in an output voltage outputted from the DC/DC converter. Japanese Unexamined Patent Application Publication No. H10-4677 discloses a power supply apparatus that stops a switching operation when an overvoltage occurs. Japanese Unexamined Patent Application Publication No. 2005-86883 discloses a power supply system that stops a relevant power supply apparatus, in a case where a malfunction that causes an overvoltage in an output voltage occurs in any of a plurality of power supply apparatuses connected in parallel.

SUMMARY

A determination circuit according to one embodiment of the disclosure includes a detection circuitry, a switch controller, and a determination circuitry. The detection circuitry is configured to detect that an overvoltage has occurred in an electric power supply path that couples an electric power conversion circuit and a load, the electric power conversion circuit being configured to generate a direct-current voltage. The switch controller is configured to turn off a switch when the detection circuitry has detected that the overvoltage has occurred, the switch being provided on the electric power supply path. The determination circuitry is configured to perform a determination operation including determining whether the overvoltage that has occurred is attributed to the electric power conversion circuit or the load, on a basis of one of or both a first voltage of a first path and a second voltage of a second path that are in a period in which the switch is off, the first path coupling the switch and the electric power conversion circuit in the electric power supply path, the second path coupling the switch and the load in the electric power supply path.

A power supply apparatus according to one embodiment of the disclosure includes an electric power conversion circuit, a switch, a detection circuitry, a switch controller, and a determination circuitry. The electric power conversion circuit is configured to generate a direct-current voltage. The switch is provided on an electric power supply path that couples the electric power conversion circuit and a load. The detection circuitry is configured to detect that an overvoltage has occurred in the electric power supply path. The switch controller is configured to turn off the switch when the detection circuitry has detected that the overvoltage has occurred. The determination circuitry is configured to perform a determination operation including determining whether the overvoltage that has occurred is attributed to the electric power conversion circuit or the load, on a basis of one of or both a first voltage of a first path and a second voltage of a second path that are in a period in which the switch is off, the first path coupling the switch and the electric power conversion circuit in the electric power supply path, the second path coupling the switch and the load in the electric power supply path.

A power supply apparatus according to one embodiment of the disclosure includes an electric power conversion circuit, a detection circuitry, and a determination circuitry. The electric power conversion circuit is configured to generate a direct-current voltage, and including a switching section configured to perform a switching operation. The detection circuitry is configured to detect that an overvoltage has occurred in an electric power supply path that couples the electric power conversion circuit and a load. The determination circuitry is configured to perform, when the detection circuitry has detected that the overvoltage has occurred, a determination operation including determining whether the overvoltage that has occurred is attributed to the electric power conversion circuit or the load, on a basis of the switching operation.

A power supply apparatus according to one embodiment of the disclosure includes an electric power conversion circuit, a detection circuitry, and a determination circuitry. The electric power conversion circuit is configured to generate a direct-current voltage, and including a switching section configured to perform a switching operation. The detection circuitry is configured to detect that an overvoltage has occurred in an electric power supply path that couples the electric power conversion circuit and a load. The determination circuitry is configured to perform, when the detection circuitry has detected that the overvoltage has occurred, a determination operation including determining whether the overvoltage that has occurred is attributed to the electric power conversion circuit or the load, on a basis of an input electric current to be inputted to the electric power conversion circuit or an output electric current outputted from the electric power conversion circuit.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
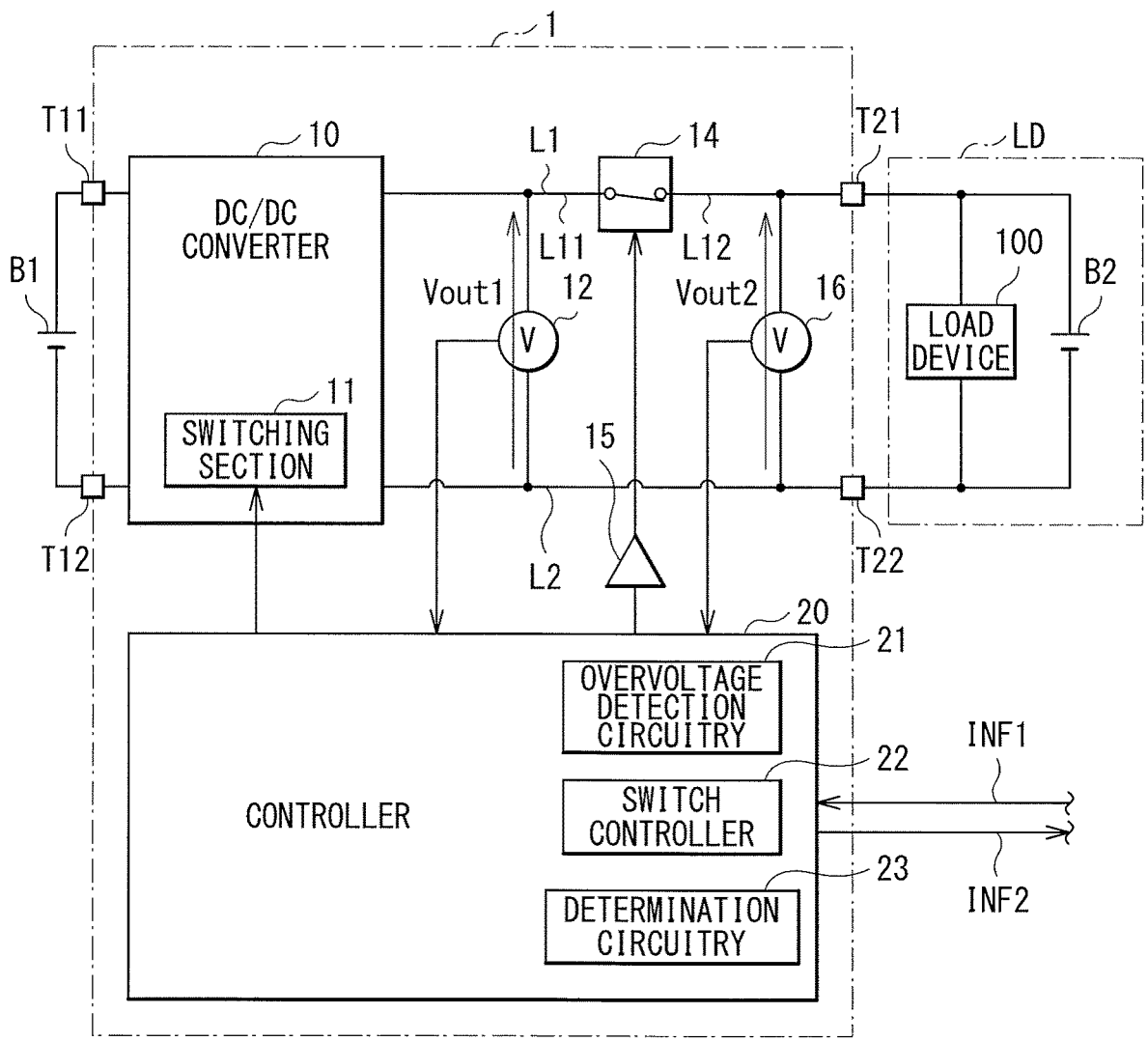
FIG. 1 is a circuit diagram illustrating a configuration example of a power supply apparatus according to one example embodiment of the disclosure.

Some embodiments of the disclosure are described below in detail with reference to the accompanying drawings.

It is to be noted that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. It is to be noted that the like elements are denoted with the same reference numerals, and any redundant description thereof will not be described in detail. The description is given in the following order.

1. First Example Embodiment (Example of performing determination operation while cutting off electric power to be supplied to a load)
2. Second Example Embodiment (Example of performing determination operation while cutting off the electric power to be supplied to the load)
3. Third Example Embodiment (Example of performing determination operation while supplying the load with the electric power)
4. Fourth Example Embodiment (Example of performing determination operation while supplying the load with the electric power)

It is desirable that a malfunction analysis be easily performed in an electronic device. What is desired is to easily perform the malfunction analysis in a power supply apparatus.

It is desirable to provide a determination circuit and a power supply apparatus that are able to easily perform a malfunction analysis.

1. First Example Embodiment

Configuration Example

FIG. 1 illustrates a configuration example of a power supply apparatus (power supply apparatus 1) according to a first example embodiment of the disclosure. It is to be noted that a determination circuit according to one example embodiment of the disclosure is embodied by the first example embodiment, and thus is described together therewith.

The power supply apparatus 1 may include terminals T11 and T12, and terminals T21 and T22. To the terminals T11 and T12, a battery B1 may be coupled. To the terminals T21 and T22, a load LD including a load device 100 and a battery B2 may be coupled. The power supply apparatus 1 may convert an electric power by raising or reducing a voltage supplied by the battery B1, and supply the load LD with the converted electric power. It is to be noted that a power supply may be provided instead of the battery B1.

The power supply apparatus 1 includes a DC/DC converter 10 and a switch 14. The power supply apparatus 1 may include an output voltage sensor 12, a driver 15, an output voltage sensor 16, and a controller 20.

The DC/DC converter 10 may be an electric power conversion circuit configured to convert a direct-current voltage V1 supplied by the battery B1 into a direct-current voltage V2. The DC/DC converter 10 may be coupled to the battery B1 via the terminals T11 and T12, and may be coupled to the load LD via a voltage line L1, a reference voltage line L2, and the terminals T21 and T22. The DC/DC converter 10 may be, for example, a non-isolation DC/DC converter or an isolation DC/DC converter. The DC/DC converter 10 may include a switching section 11. The switching section 11 may be configured to perform a switching operation on the basis of a switching control signal supplied by the controller 20. The switching section 11 may include one or a plurality of switching transistors. The switching section 11 may include a full-bridge circuit, for example. The DC/DC converter 10 may perform an electric power conversion with the use of a pulse width modulation (PWM), for example. It is to be noted that the electric power conversion is not limited thereto, and may also be performed with the use of a pulse frequency modulation (PFM), instead of the PWM, for example.

The output voltage sensor 12 may be configured to detect a voltage of the voltage line L1. The voltage line L1 may include voltage lines L11 and L12. The voltage line L11 may be a part between the DC/DC converter 10 and the switch 14 in the voltage line L1, and the voltage line L12 may be a part between the switch 14 and the terminal T21 in the voltage line L1. One end of the output voltage sensor 12 may be coupled to the voltage line L11, and the other end of the output voltage sensor 12 may be coupled to the reference voltage line L2. The output voltage sensor 12 may detect, as a voltage Vout1, a voltage of the voltage line L1 (voltage line L11) based on a voltage of the reference voltage line L2 as a reference. Further, the output voltage sensor 12 may supply the controller 20 with a voltage corresponding to the detected voltage Vout1.

The switch 14 may be configured to supply the load LD with the direct-current electric power generated by the DC/DC converter 10, or cut off the supply of the direct-current electric power to the load LD. The switch 14 is provided on the voltage line L1. One end of the switch 14 may be coupled to the DC/DC converter 10 via the voltage line L11, and the other end of the switch 14 may be coupled to the terminal T21 via the voltage line L12. The switch 14 may be turned on and off on the basis of a control signal supplied by the driver 15.

The driver 15 may be configured to drive the switch 14 on the basis of a control signal supplied by the controller 20.

Figure 2:
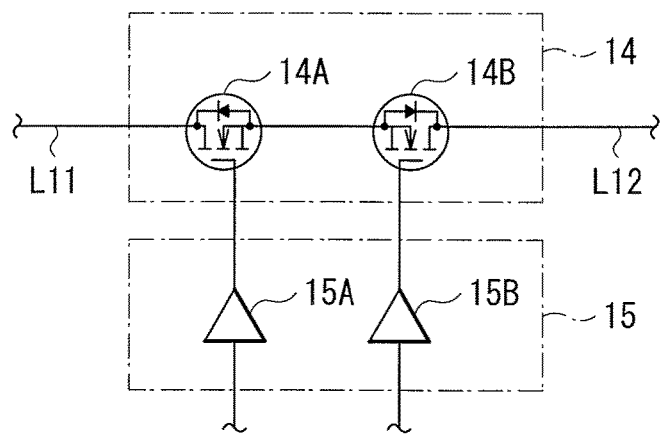
FIG. 2 is a circuit diagram illustrating a configuration example of a switch illustrated in FIG. 1.

FIG. 2 illustrates a configuration example of the switch 14 and the driver 15. The switch 14 may include two transistors, i.e., a transistor 14A and a transistor 14B. The driver 15 may include two drivers, i.e., a driver 15A and a driver 15B. The transistors 14A and 14B may each include an N-type power metal oxide semiconductor field effect transistor (MOSFET), for example. A drain of the transistor 14A may be coupled to the voltage line L11, a source of the transistor 14A may be coupled to a source of the transistor 14B, and a gate of transistor 14A may be coupled to an output terminal of the driver 15A. In a case where an anode terminal and a cathode terminal of the battery B2 are reversely coupled by mistake, the transistor 14A may cut the connection between the DC/DC converter 10 and the load LD. A drain of the transistor 14B may be coupled to the voltage line L12, the source of the transistor 14B may be coupled to the source of the transistor 14A, and a gate of the transistor 14B may be coupled to an output terminal of the driver 15B. In a case where an electric current flows from the load LD to the DC/DC converter 10, the transistor 14B may cut the connection between the DC/DC converter 10 and the load LD. An input terminal of the driver 15A may be supplied with a control signal by the controller 20, and the output terminal of the driver 15A may be coupled to the gate of the transistor 14A. An input terminal of the driver 15B may be supplied with a control signal by the controller 20, and the output terminal of the driver 15B may be coupled to the gate of the transistor 14B.

The output voltage sensor 16 may be configured to detect a voltage of the voltage line L1. One end of the output voltage sensor 16 may be coupled to the voltage line L12, and the other end of the output voltage sensor 16 may be coupled to the reference voltage line L2. The output voltage sensor 16 may detect, as a voltage Vout2, a voltage of the voltage line L1 (voltage line L12) based on the voltage of the reference voltage line L2 as a reference. Further, the output voltage sensor 16 may supply the controller 20 with a voltage corresponding to the detected voltage Vout2.

The controller 20 may be configured to control an operation of the power supply apparatus 1 on the basis of control data INF1 supplied by an external controller (not illustrated). In one example, the controller 20 may cause the switching section 11 to perform the switching operation by supplying the switching section 11 with the switching control signal. For example, the controller 20 may control the operation of the switching section 11, on the basis of the voltage Vout1 detected by the output voltage sensor 12, such that the voltage V2 to be generated by the DC/DC converter 10 is near a target voltage Vtarget indicated by target voltage data included in the control data INF1. Further, the controller 20 may control an operation of the switch 14 on the basis of an operation state of the power supply apparatus 1. Still further, in a case where an overvoltage has occurred in the voltage of the voltage line L1, the controller 20 may turn off the transistors 14A and 14B and may determine a cause of the overvoltage on the basis of the voltage Vout2 detected by the output voltage sensor 16. Further, the controller 20 may notify the external controller of a result of the determination using notification data INF2. For example, the controller 20 may include a microcontroller. The controller 20 may be or may include an overvoltage detection circuitry 21, a switch controller 22, and a determination circuitry 23.

The overvoltage detection circuitry 21 is configured to detect whether the overvoltage has occurred in the voltage of the voltage line L1. In one example, the overvoltage detection circuitry 21 may detect that the overvoltage has occurred in the voltage of the voltage line L1, in a case where the voltage Vout2 detected by the output voltage sensor 16 exceeds a threshold voltage that is set higher than the target voltage Vtarget.

The switch controller 22 may be configured to control the operation of the switch 14. In one example, the switch controller 22 may turn off the transistor 14B in a case where the electric current flows from the load LD to the DC/DC converter 10, for example. Further, the switch controller 22 may turn off the transistor 14A in a case where the anode terminal and the cathode terminal of the battery B2 are reversely coupled by mistake, for example. Still further, the switch controller 22 turns off the transistors 14A and 14B in a case where the overvoltage has occurred in the voltage of the voltage line L1.

The determination circuitry 23 may be configured to determine a cause of the overvoltage in a case where the overvoltage has occurred in the voltage of the voltage line L1. In one example, the determination circuitry 23 may determine a cause of the overvoltage on the basis of the voltage Vout2 detected by the output voltage sensor 16, while the transistors 14A and 14B are off.

With such a configuration, the power supply apparatus 1 may convert the voltage V1 supplied by the battery B1 on the basis of the target voltage Vtarget indicated by the target voltage data included in the control data INF1, to thereby generate the voltage V2, and may supply the load LD with the generated voltage V2. Further, in a case where the overvoltage has occurred in the voltage of the voltage line L1, for example, the power supply apparatus 1 may turn off the transistors 14A and 14B, may determine a cause of the overvoltage on the basis of the voltage Vout2 detected by the output voltage sensor 16. Further, the power supply apparatus 1 may notify the external controller of a result of the determination using the notification data INF2.

In one embodiment of the disclosure, the overvoltage detection circuitry 21 may correspond to a specific but non-limiting example of a "detection circuitry". In one embodiment of the disclosure, the switch controller 22 may correspond to a specific but non-limiting example of a "switch controller". In one embodiment of the disclosure, the determination circuitry 23 may correspond to a specific but non-limiting example of a "determination circuitry". In one embodiment of the disclosure, the DC/DC converter 10 may correspond to a specific but non-limiting example of an "electric power conversion circuit". In one embodiment of the disclosure, the voltage line L1 may correspond to a specific but non-limiting example of an "electric power supply path". In one embodiment of the disclosure, the switch 14 may correspond to a specific but non-limiting example of a "switch".

[Operations and Workings]

Next, description is given of operations and workings of the power supply apparatus 1 according to the first example embodiment.

[Overview of Overall Operations]

First, with reference to FIG. 1, description is given of an overview of overall operations performed by the power supply apparatus 1. The DC/DC converter 10 may convert the direct-current voltage V1 supplied by the battery B1 to thereby generate the direct-current voltage V2. The output voltage sensor 12 may detect, as the voltage Vout1, the voltage of the voltage line L1 (voltage line L11), and may supply the controller 20 with the voltage corresponding to the detected voltage Vout1. The driver 15 may drive the switch 14 on the basis of the control signal supplied by the controller 20. The switch 14 may supply the load LD with the direct-current electric power generated by the DC/DC converter 10, or may cut off the supply of the direct-current electric power to the load LD. The output voltage sensor 16 may detect, as the voltage Vout2, the voltage of the voltage line L1 (voltage line L12), may supply the controller 20 with the voltage corresponding to the detected voltage Vout2. The controller 20 may control the operation of the power supply apparatus 1 on the basis of the control data INF1 supplied by the unillustrated external controller.

[Detailed Operations]

The power supply apparatus 1 may convert the voltage V1 supplied by the battery B1 on the basis of the target voltage Vtarget indicated by the target voltage data included in the control data INF1, to thereby generate the voltage V2, and may supply the load LD with the generated voltage V2. Thereafter, in a case where the overvoltage has occurred in the voltage of the voltage line L1, for example, the power supply apparatus 1 may turn off the transistors 14A and 14B, and may determine a cause of the overvoltage on the basis of the voltage Vout2 detected by the output voltage sensor 16. Further, the power supply apparatus 1 may notify the external controller of a result of the determination using the notification data INF2. Hereinafter, the operations are described in detail.

Figure 3:
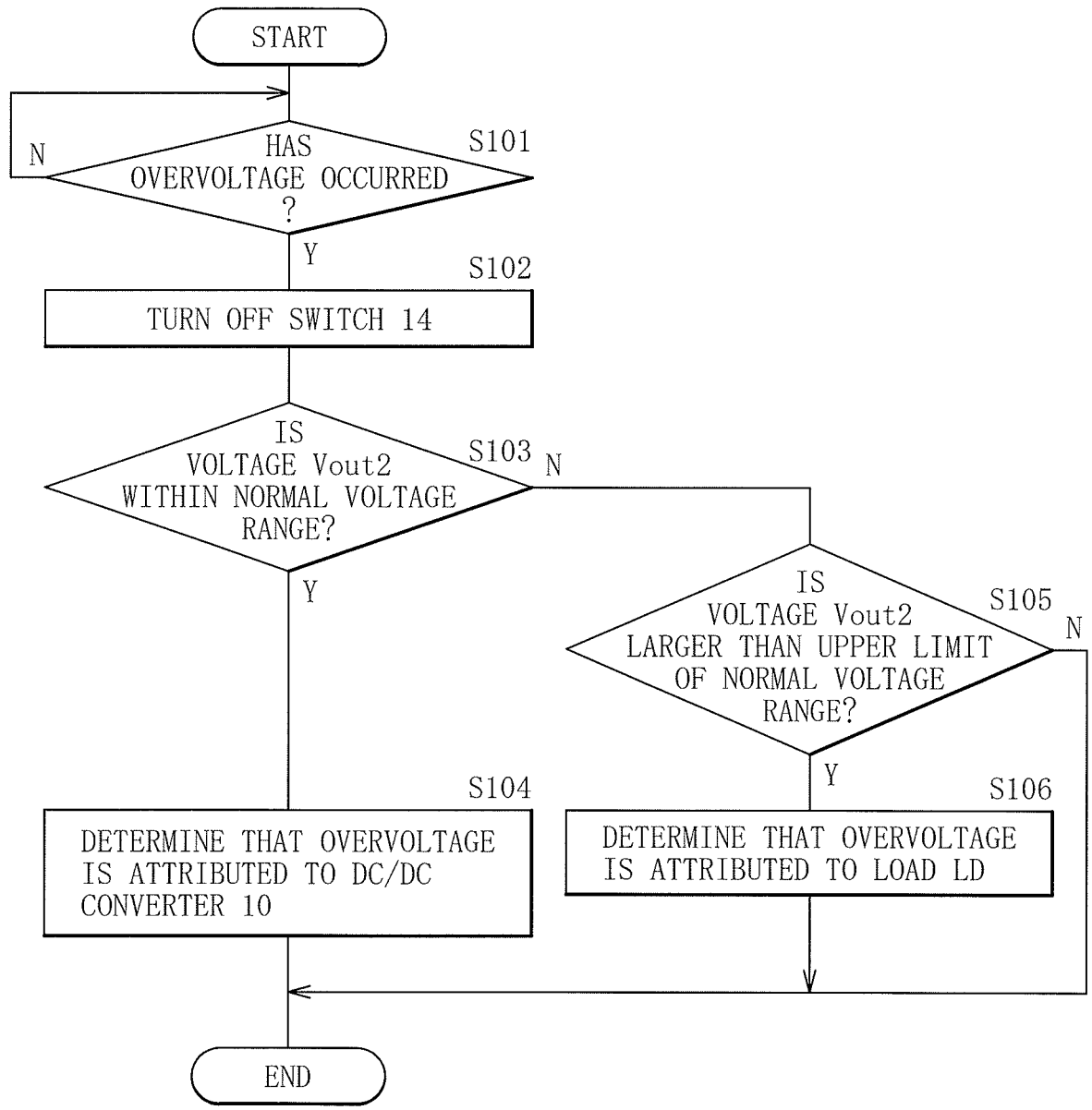
FIG. 3 is a flowchart illustrating an operation example of the power supply apparatus illustrated in FIG. 1.

FIG. 3 illustrates an example of operations of determining a cause of the overvoltage. First, the overvoltage detection circuitry 21 included in the controller 20 may confirm whether the overvoltage has occurred in the voltage of the voltage line L1 on the basis of the voltage Vout2 detected by the output voltage sensor 16 (step S101). In one example, the overvoltage detection circuitry 21 may detect that the overvoltage has occurred in the voltage of the voltage line L1 in a case where the voltage Vout2 exceeds the threshold voltage that is set higher than the target voltage Vtarget. If the overvoltage detection circuitry 21 has confirmed that the overvoltage has not occurred ("N" in step S101), step S101 may be repeated until the overvoltage occurs.

If the overvoltage detection circuitry 21 has confirmed that the overvoltage has occurred in step S101 ("Y" in step S101), the switch controller 22 included in the controller 20 may turn off the transistors 14A and 14B, to thereby turn off the switch 14 (step S102).

Thereafter, the determination circuitry 23 included in the controller 20 may confirm whether the voltage Vout2 detected by the output voltage sensor 16, while the transistors 14A and 14B are off, is within a normal voltage range (step S103). The normal voltage range may be a voltage range having a predetermined voltage width which has the target voltage Vtarget as its center voltage, for example.

In step S103, if the voltage Vout2 is within the normal voltage range ("Y" in step S103), the determination circuitry 23 may determine that the overvoltage that has occurred is attributed to the DC/DC converter 10 (step S104). That is, because the switch 14 is off, the overvoltage has no influence on the load LD meaning that the voltage Vout2 is expected to be within the normal voltage range in a case where the overvoltage is attributed to the DC/DC converter 10. Accordingly, in a case where the voltage Vout2 is within the normal voltage range, the determination circuitry 23 may determine that the overvoltage is attributed to the DC/DC converter 10. Thereafter, the flow may be terminated.

In step S103, if the voltage Vout2 is not within the normal voltage range ("N" in step S103), the determination circuitry 23 may confirm whether the voltage Vout2 is larger than an upper limit of the normal voltage range (step S105). If the voltage Vout2 is not larger than the upper limit of the normal voltage range ("N" in step S105), the flow may be terminated.

In step S105, if the voltage Vout2 is larger than the upper limit of the normal voltage range ("Y" in step S105), the determination circuitry 23 may determine that the overvoltage that has occurred is attributed to the load LD (step S106). That is, because the switch 14 is off, the fact that the voltage Vout2 is larger than the upper limit of the normal voltage range may indicate that the overvoltage is attributed to the load LD. Thereafter, the flow may be terminated.

The power supply apparatus 1 may notify, using the notification data INF2, the external controller of data regarding which of the DC/DC converter 10 and the load LD the overvoltage that has occurred is attributed to. Thereafter, the power supply apparatus 1 may stop the operation of the switching section 11. In this way, the DC/DC converter 10 may stop generating the voltage V2.

The external controller may obtain, on the basis of the notification data INF2, the data regarding which of the DC/DC converter 10 and the load LD the overvoltage that has occurred is attributed to. Thereafter, for example, in a case where the overvoltage that has occurred is attributed to the DC/DC converter 10, the power supply apparatus 1 may restart the operation only when receiving the control data INF1 including, for example, a reset command, from the external controller. Further, for example, in a case where the overvoltage that has occurred is attributed to the load LD, the power supply apparatus 1 may restart the operation when an abnormality in the load LD is resolved.

The power supply apparatus 1 may determine a cause of the overvoltage as described above. In one example, in the power supply apparatus 1, it is determined whether the overvoltage that has occurred is attributed to the DC/DC converter 10 or the load LD. This makes it easier to perform a malfunction analysis in a case where a malfunction occurs in a system including the power supply apparatus 1. Further, this makes it possible for a manufacturer of the power supply apparatus 1 to easily determine whether the malfunction is attributed to a product of the manufacturer, allowing the manufacturer to efficiently execute tasks.

Moreover, in the power supply apparatus 1, the operation of the switching section 11 may be caused to stop after a cause of the overvoltage is determined. Thus, it is possible to stop immediately the operation of the DC/DC converter 10. Therefore, it is possible to enhance safety.

In addition, in the power supply apparatus 1, the switch 14 may be provided on the voltage line L1, and it is determined whether the overvoltage that has occurred is attributed to the DC/DC converter 10 or the load LD on the basis of the voltage of the voltage line L12 that couples the switch 14 and the load LD, while the switch 14 is off. In this way, in the power supply apparatus 1, it is possible to determine a cause of the overvoltage using a simple method.

Example Effects

In the first example embodiment as described above, a cause of the overvoltage is determined. Hence, it is possible to easily perform the malfunction analysis.

In the first example embodiment, the operation of the switching section is caused to stop after a cause of the overvoltage is determined. Hence, it is possible to enhance safety.

In the first example embodiment, the switch may be provided, and it is determined whether the overvoltage that has occurred is attributed to the DC/DC converter or the load on the basis of the voltage of the voltage line that couples the switch and the load, while the switch is off. In this way, it is possible to determine a cause of the overvoltage using a simple method.

Modification Example 1-1

In the first example embodiment, a cause of the overvoltage is determined on the basis of the voltage Vout2 detected by the output voltage sensor 16. However, the disclosure is not limited thereto. A cause of the overvoltage may be determined on the basis of, instead of the voltage Vout2 detected by the output voltage sensor 16, the voltage Vout1 detected by the output voltage sensor 12, for example. Hereinafter, a power supply apparatus 1A according to a modification example 1-1 is described in detail.

Figure 4:
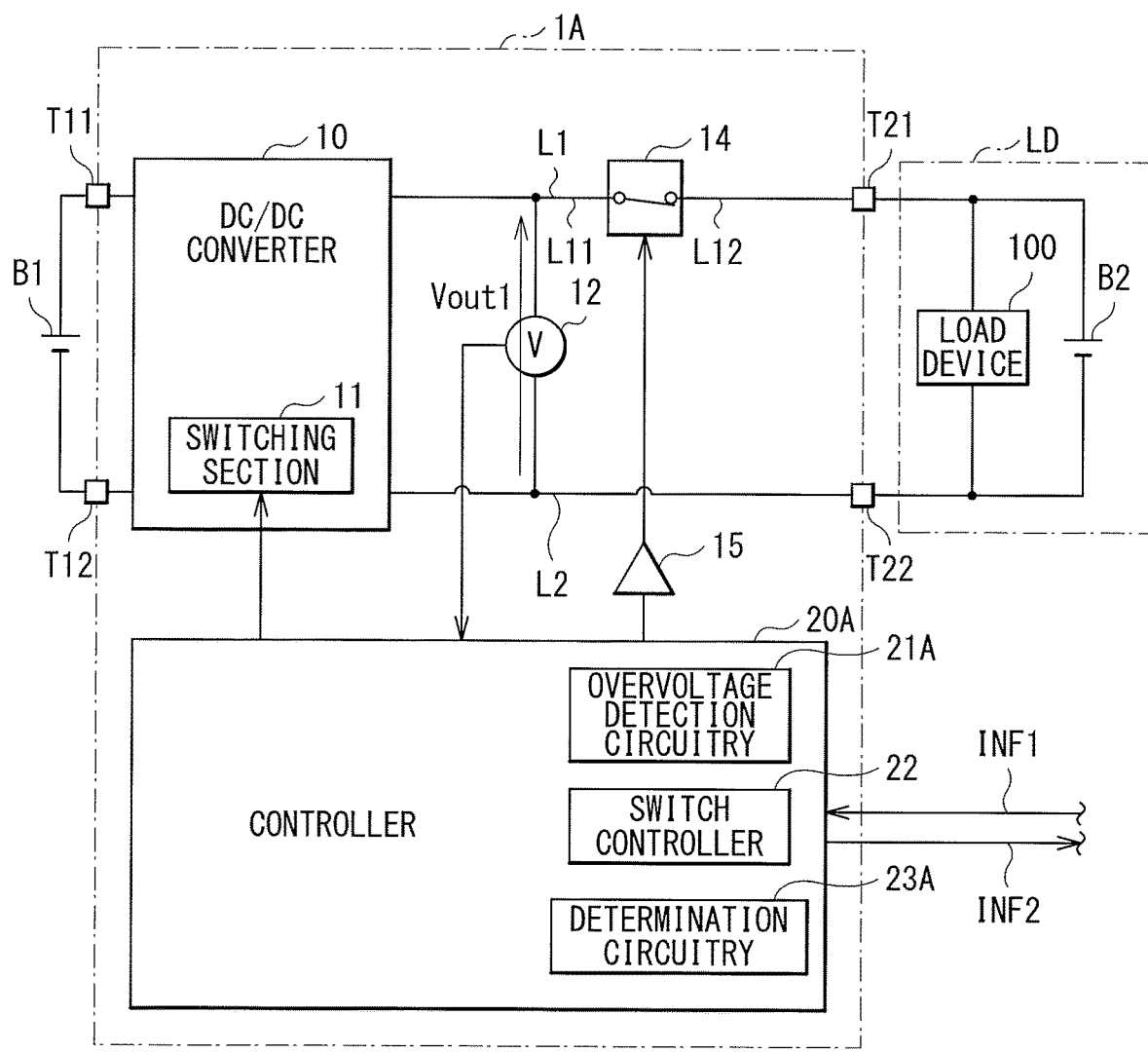
FIG. 4 is a circuit diagram illustrating a configuration example of a power supply apparatus according to a modification example of one example embodiment.

FIG. 4 illustrates a configuration example of the power supply apparatus 1A. The power supply apparatus 1A may include the DC/DC converter 10, the output voltage sensor 12, the switch 14, the driver 15, and a controller 20A. That is, the power supply apparatus 1A is different from the power supply apparatus 1 (FIG. 1) according to the first example embodiment in that the output voltage sensor 16 is omitted and that the controller 20 is replaced by the controller 20A.

The controller 20A may include an overvoltage detection circuitry 21A and a determination circuitry 23A. The overvoltage detection circuitry 21A may be configured to detect that the overvoltage has occurred in the voltage of the voltage line L1, in a case where the voltage Vout1 detected by the output voltage sensor 12 exceeds a threshold voltage that is set higher than the target voltage Vtarget. The determination circuitry 23A may be configured to determine a cause of the overvoltage on the basis of the voltage Vout1 detected by the output voltage sensor 12, while the transistors 14A and 14B are off.

Figure 5:
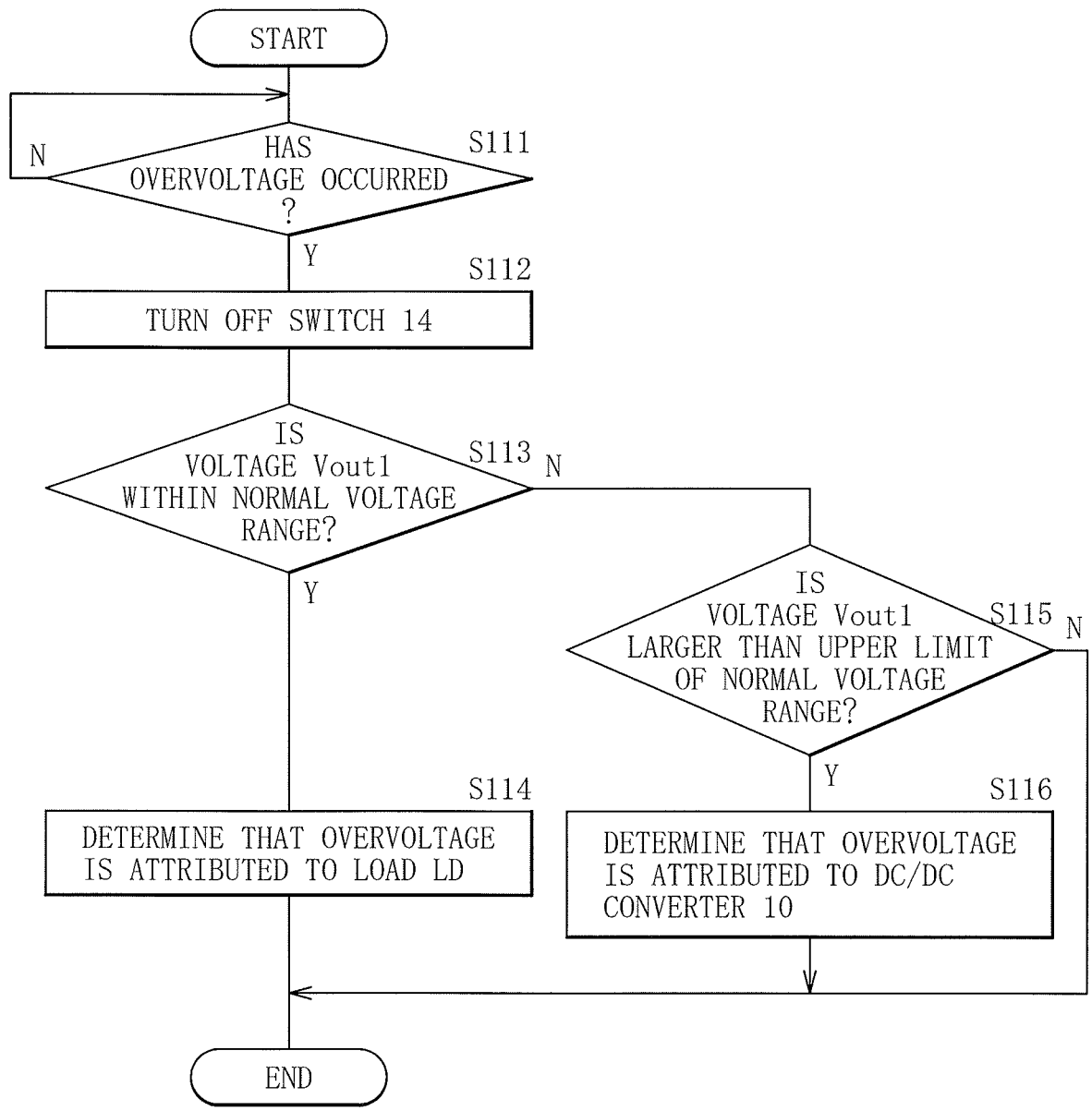
FIG. 5 is a flowchart illustrating an operation example of the power supply apparatus illustrated in FIG. 4.

FIG. 5 illustrates an example of an operation of determining a cause of the overvoltage. First, the overvoltage detection circuitry 21A may confirm whether the overvoltage has occurred in the voltage of the voltage line L1 on the basis of the voltage Vout1 detected by the output voltage sensor 12 (step S111). If the overvoltage detection circuitry 21A has confirmed that the overvoltage has occurred, the switch controller 22 may turn off the transistors 14A and 14B, to thereby turn off the switch 14 (step S102).

Thereafter, the determination circuitry 23A may confirm whether the voltage Vout1 detected by the output voltage sensor 12, while the transistors 14A and 14B are off, is within a normal voltage range (step S113).

In step S113, if the voltage Vout1 is within the normal voltage range ("Y" in step S113), the determination circuitry 23A may determine that the overvoltage that has occurred is attributed to the load LD (step S114). That is, because the switch 14 is off, the overvoltage has no influence on the DC/DC converter 10 meaning that the voltage Vout1 is expected to be within the normal voltage range in a case where the overvoltage is attributed to the load LD. Accordingly, in a case where the voltage Vout1 is within the normal voltage range, the determination circuitry 23A may determine that the overvoltage is attributed to the load LD. Thereafter, the flow may be terminated.

In step S113, if the voltage Vout1 is not within the normal voltage range ("N" in step S113), the determination circuitry 23A may confirm whether the voltage Vout1 is larger than an upper limit of the normal voltage range (step S115). If voltage Vout1 is not larger than the upper limit of the normal voltage range ("N" in step S115), the flow may be terminated.

In step S115, if the voltage Vout1 is larger than the upper limit of the normal voltage range ("Y" in step S115), the determination circuitry 23A may determine that the overvoltage that has occurred is attributed to the DC/DC converter 10 (step S116). That is, because the switch 14 is off, the fact that the voltage Vout1 is larger than the upper limit of the normal voltage range may indicate that the overvoltage is attributed to the DC/DC converter 10. Thereafter, the flow may be terminated.

It is to be noted that, although a cause of the overvoltage is determined on the basis of the voltage Vout1 detected by the output voltage sensor 12 in the modification example 1-1, a cause of the overvoltage may be determined on the basis of both the voltage Vout1 detected by the output voltage sensor 12 and the voltage Vout2 detected by the output voltage sensor 16.

Modification Example 1-2

In the first example embodiment, the two transistors, i.e., the transistors 14A and 14B are included in the switch 14, however, the disclosure is not limited thereto. For example, the transistor 14A may be omitted. In this case, the driver 15 may include one driver, i.e., the driver 15B. The drain of the transistor 14B may be coupled to the voltage line L12, the source of the transistor 14B may be coupled to the voltage line L11, and the gate of the transistor 14B may be coupled to the output terminal of the driver 15B. In this case, the power supply apparatus according to the modification example 1-2 may determine a cause of the overvoltage on the basis of the voltage Vout1 detected by the output voltage sensor 12, for example, in the similar manner to the power supply apparatus 1A according to the modification example 1-1 (FIG. 3).

2. Second Example Embodiment

Next, description is given of a power supply apparatus 2 according to a second example embodiment. The power supply apparatus 2 may be configured to estimate a voltage value of the voltage V2 to be generated by the DC/DC converter on the basis of the switching operation performed in the DC/DC converter, and determine a cause of the overvoltage on the basis of the estimated voltage value. It is to be noted that components that are substantially the same as the components included in the power supply apparatus 1 according to the first example embodiment are denoted with the same reference numerals, and any redundant description will be omitted as appropriate.

Figure 6:
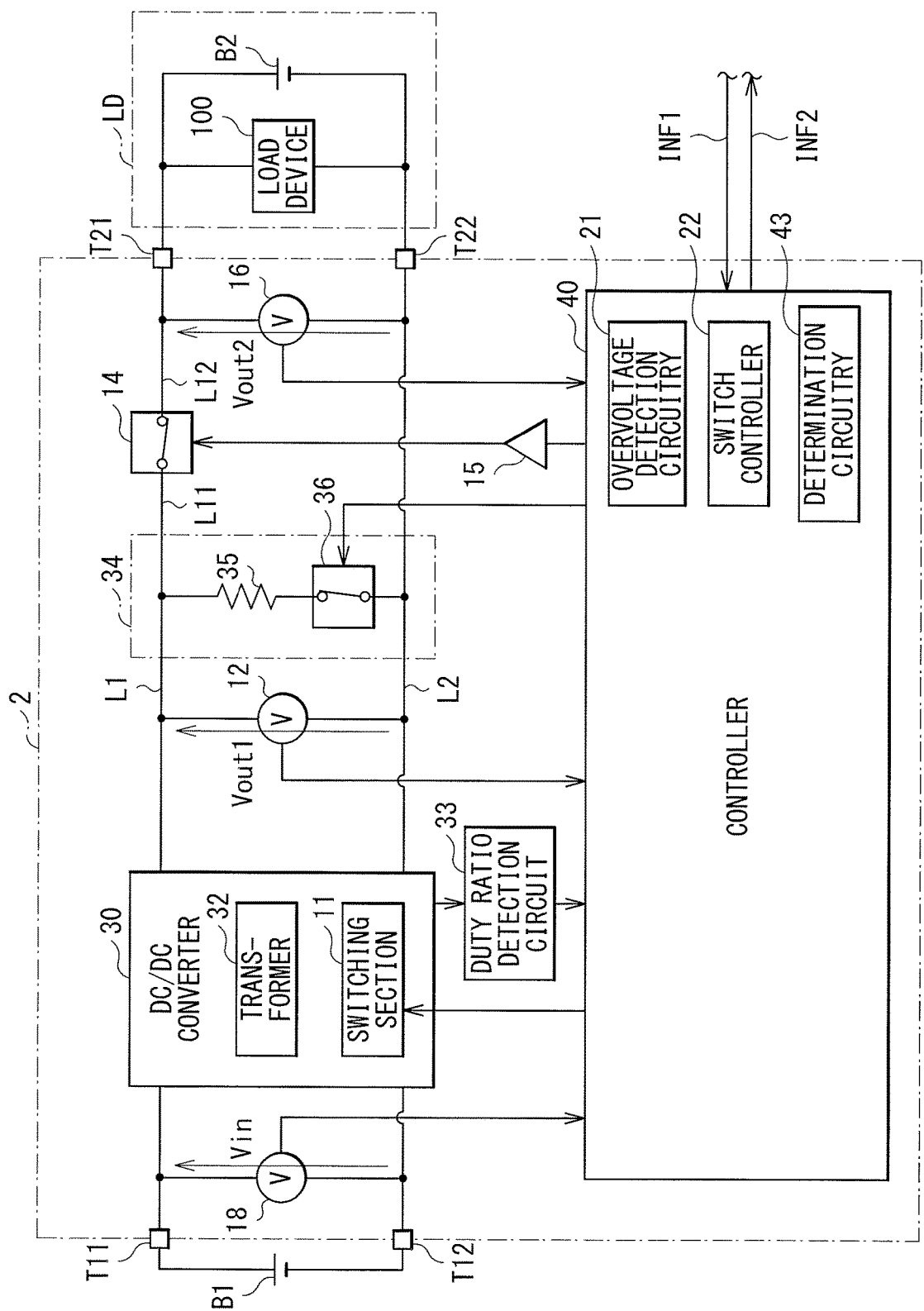
FIG. 6 is a circuit diagram illustrating a configuration example of a power supply apparatus according to one example embodiment.

FIG. 6 illustrates a configuration example of the power supply apparatus 2. The power supply apparatus 2 may include an input voltage sensor 18, a DC/DC converter 30, a duty ratio detection circuit 33, a light load circuit 34, and a controller 40.

The input voltage sensor 18 may be configured to detect a voltage V1 to be inputted to the DC/DC converter 30. One end of the input voltage sensor 18 may be coupled to the terminal T11, and the other end of the input voltage sensor 18 may be coupled to the terminal T12. The input voltage sensor 18 may detect, as a voltage Vin, a voltage of the terminal T11 based on a voltage of the terminal T12 as a reference. Thereafter, the input voltage sensor 18 may supply the controller 40 with a voltage corresponding to the detected voltage Vin.

The DC/DC converter 30 may be an electric power conversion circuit that converts the direct-current voltage V1 supplied by the battery B1 into the direct-current voltage V2. The DC/DC converter 30 may be an isolation DC/DC converter, and may include the switching section 11 and a transformer 32. The transformer 32 may include a primary winding and a secondary winding. The switching section 11 may be coupled to the primary winding of the transformer 32. The DC/DC converter 30 may perform the electric power conversion with the use of the pulse width modulation.

The duty ratio detection circuit 33 may be configured to detect a duty ratio DR of the switching operation performed by the switching section 11 included in the DC/DC converter 30. In one example, the duty ratio detection circuit 33 may be configured to detect the duty ratio DR on the basis of a rectangular wave signal outputted from the secondary winding of the transformer 32, for example. Thereafter, the duty ratio detection circuit 33 may supply the controller 40 with data regarding the detected duty ratio DR.

The light load circuit 34 may be configured to operate as a load on the DC/DC converter 30. One end of the light load circuit 34 may be coupled to the voltage line L11, and the other end of the light load circuit 34 may be coupled to the reference voltage line L2. The light load circuit 34 may include a resistor 35 and a load switch 36. One end of the resistor 35 may be coupled to the voltage line L11, and the other end of the resistor 35 may be coupled to one end of the load switch 36. The one end of the load switch 36 may be coupled to the other end of the resistor 35, and the other end of the load switch 36 may be coupled to the reference voltage line L2. The load switch 36 may include an N-type field effect transistor (FET), for example. The light load circuit 34 may operate as a light load on the DC/DC converter 30 by turning on the load switch 36.

When the switch 14 is turned off, the power supply apparatus 2 may turn on the load switch 36 to thereby cause the light load circuit 34 to operate as a light load on the DC/DC converter 30. This may decrease, in the power supply apparatus 2, a possibility that the so-called intermittent oscillation may occur in the DC/DC converter 30.

The controller 40 may include a determination circuitry 43. The determination circuitry 43 may calculate, as a voltage Vocal, an estimated value of the voltage V2 to be generated by the DC/DC converter 30, on the basis of a winding ratio WR between the primary winding and the secondary winding included in the transformer 32, the voltage Vin detected by the input voltage sensor 18, and the duty ratio DR detected by the duty ratio detection circuit 33. Thereafter, the determination circuitry 43 may determine a cause of the overvoltage on the basis of the calculated voltage Vocal.

Figure 7:
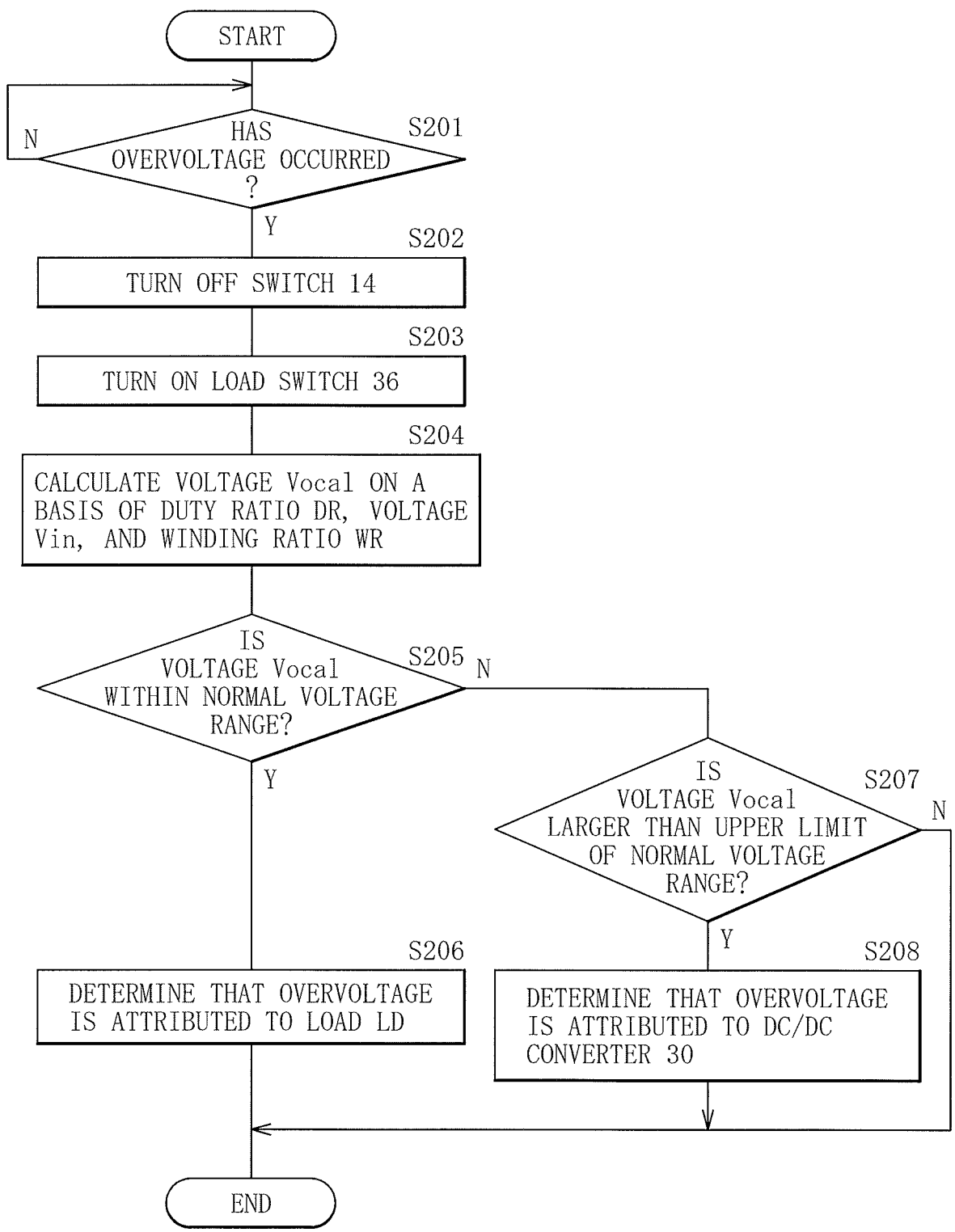
FIG. 7 is a flowchart illustrating an operation example of the power supply apparatus illustrated in FIG. 6.

FIG. 7 illustrates an example of an operation of determining a cause of the overvoltage. First, the overvoltage detection circuitry 21 included in the controller 40 may confirm whether the overvoltage has occurred in the voltage of the voltage line L1 on the basis of the voltage Vout2 detected by the output voltage sensor 16 (step S201). If the overvoltage detection circuitry 21 has confirmed that the overvoltage has occurred, the switch controller 22 included in the controller 40 may turn off the transistors 14A and 14B, to thereby turn off the switch 14 (step S202).

Thereafter, the controller 40 may turn on the load switch 36 (step S203). In this way, the light load circuit 34 may operate as a light load on the DC/DC converter 30.

Thereafter, the determination circuitry 43 included in the controller 40 may calculate the voltage Vocal, which is the estimated value of the voltage V2 to be generated by the DC/DC converter 30, on the basis of the duty ratio DR detected by the duty ratio detection circuit 33 and the voltage Vin detected by the input voltage sensor 18 while the transistors 14A and 14B are off, and on the basis of the winding ratio WR of the transformer 32 (step S204). In this case, the light load circuit 34 may operate as the light load on the DC/DC converter 30. Thus, it is possible to reduce a possibility that the intermittent oscillation may occur in the DC/DC converter 30, and a desired duty ratio DR is obtainable. In this way, it is possible to enhance accuracy of calculating the voltage Vocal in the power supply apparatus 2. In one embodiment of the disclosure, the light load circuit 34 may correspond to a specific but non-limiting example of a "load circuit".

Thereafter, the determination circuitry 43 may confirm whether the voltage Vocal is within a normal voltage range (step S205). If voltage Vocal is within the normal voltage range ("Y" in step S205), the determination circuitry 43 may determine that the overvoltage that has occurred is attributed to the load LD (step S206), in the similar manner to the determination circuitry 23A according to the modification examples of the first example embodiment (step S114 in FIG. 5). Thereafter, the flow may be terminated.

In step S205, if the voltage Vocal is not within the normal voltage range ("N" in step S205), the determination circuitry 43 may confirm whether the voltage Vocal is larger than an upper limit of the normal voltage range (step S207). In a case were the voltage Vocal is not larger than the upper limit of the normal voltage range ("N" in step S207), the flow may be terminated.

In step S207, if the voltage Vocal is larger than the upper limit of the normal voltage range ("Y" in step S207), the determination circuitry 43 may determine that the overvoltage that has occurred is attributed to the DC/DC converter 30 (step S208), in the similar manner to the determination circuitry 23A according to the modification examples of the first example embodiment (step S116 in FIG. 5). Thereafter, the flow may be terminated.

Thereafter, the power supply apparatus 2 may notify, using the notification data INF2 for example, the external controller of data regarding which of the DC/DC converter 30 and the load LD the overvoltage that has occurred is attributed to. Thereafter, the power supply apparatus 2 may stop the operation of the switching section 11, for example. In this way, the DC/DC converter 30 may stop generating the voltage V2.

As described above, in the power supply apparatus 2, the voltage value of the voltage V2 to be generated by the DC/DC converter 30 is estimated on the basis of the switching operation performed in the DC/DC converter 30. In one example, in the power supply apparatus 2, the voltage Vocal which is the estimated value of the voltage V2 to be generated by the DC/DC converter 30 is calculated on the basis of the duty ratio DR of the switching operation. The power supply apparatus 2 determines a cause of the overvoltage on the basis of the calculated voltage Vocal. In this manner, in the power supply apparatus 2, it is possible to determine a cause of the overvoltage without using the voltage Vout2 detected by the output voltage sensor 16.

In the second example embodiment as described above, the voltage value of the voltage to be generated by the DC/DC converter is estimated on the basis of the switching operation performed in the DC/DC converter, and a cause of the overvoltage is determined on the basis of the estimated voltage. Thus, it is possible to determine a cause of the overvoltage without using the voltage Vout2 detected by the output voltage sensor 16. Other example effects thereof are similar to the case of the first example embodiment.

Modification Example 2-1

In the second example embodiment, the output voltage sensor 16 is provided. However, the disclosure is not limited thereto. Alternatively, the output voltage sensor 16 may be omitted, for example. In this case, in step S201, the overvoltage detection circuitry 21 may confirm whether the overvoltage has occurred in the voltage of the voltage line L1 on the basis of the voltage Vout1 detected by the output voltage sensor 12, for example.

Modification Example 2-2

In the second example embodiment, the DC/DC converter 30 that performs the electric power conversion by the pulse width modulation is provided. However, the disclosure is not limited thereto. Alternatively, a DC/DC converter may be provided, as with a power supply apparatus 2A illustrated in FIG. 8, for example, which performs the electric power conversion with the use of the pulse frequency modulation. The power supply apparatus 2A may include a DC/DC converter 30A, a switching frequency detection circuit 33A, and a controller 40A.

The DC/DC converter 30A may be an isolation DC/DC converter, and may include the switching section 11 and the transformer 32. The DC/DC converter 30A may perform the electric power conversion with the use of the pulse frequency modulation.

The switching frequency detection circuit 33A may be configured to detect a switching frequency FSW of the switching operation performed by the switching section 11 included in the DC/DC converter 30A. In one example, the switching frequency detection circuit 33A may be configured to detect the switching frequency FSW by counting the number of pulses in a rectangular wave signal outputted from the secondary winding of the transformer 32, for example. Further, the switching frequency detection circuit 33A may supply the controller 40A with data regarding the detected switching frequency FSW.

The controller 40A may include a determination circuitry 43A. The determination circuitry 43A may calculate, as the voltage Vocal, the estimated value of the voltage V2 to be generated by the DC/DC converter 30A, on the basis of the winding ratio WR of the transformer 32, the voltage Vin detected by the input voltage sensor 18, and the switching frequency FSW detected by the switching frequency detection circuit 33A. Thereafter, the determination circuitry 43A may determine a cause of the overvoltage on the basis of the calculated voltage Vocal.

Operations of determining a cause of the overvoltage in the power supply apparatus 2A are similar to the case of the power supply apparatus 2 according to the second example embodiment (FIG. 7) except step S204. In step S204, the determination circuitry 43A of the power supply apparatus 2A may calculate the voltage Vocal, which is the estimated value of the voltage V2 to be generated by the DC/DC converter 30, on the basis of the switching frequency FSW detected by the switching frequency detection circuit 33A and the voltage Vin detected by the input voltage sensor 18 while the transistors 14A and 14B are off, and on the basis of the winding ratio WR of the transformer 32.

3. Third Example Embodiment

Next, description is given of a power supply apparatus 3 according to a third example embodiment. The power supply apparatus 3 does not include the switch 14, and configured to, while supplying the load LD with the voltage V2 generated by the DC/DC converter, determine a cause of the overvoltage. It is to be noted that components that are substantially the same as the components included in the power supply apparatus 2 according to the second example embodiment are denoted with the same reference numerals, and any redundant description will be omitted as appropriate.

Figure 9:
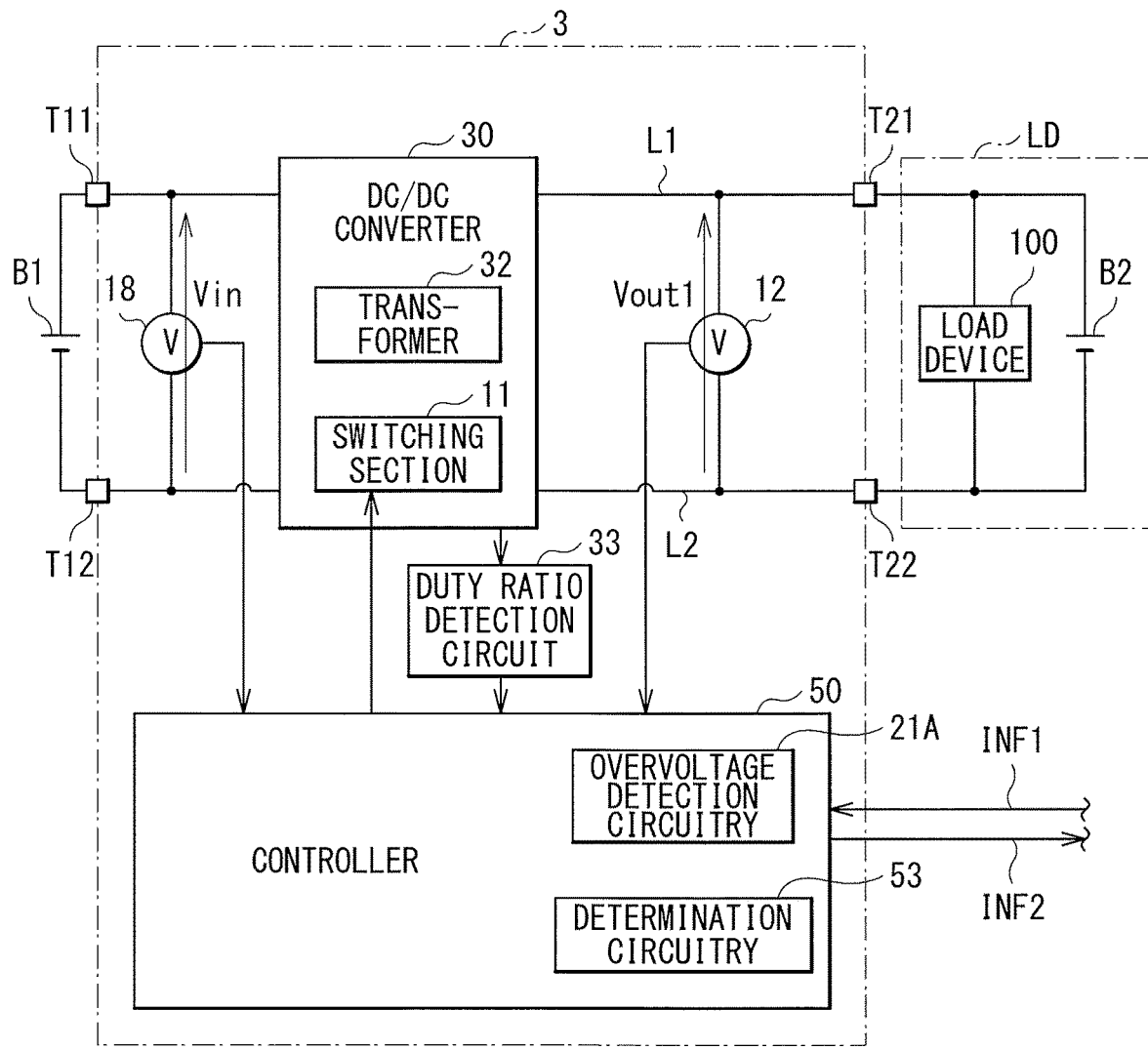
FIG. 9 is a circuit diagram illustrating a configuration example of a power supply apparatus according to one example embodiment.

FIG. 9 illustrates a configuration example of the power supply apparatus 3. The power supply apparatus 3 may include the input voltage sensor 18, the DC/DC converter 30, the duty ratio detection circuit 33, the output voltage sensor 12, and a controller 50.

The controller 50 may include the overvoltage detection circuitry 21A and a determination circuitry 53. The overvoltage detection circuitry 21A may be configured to detect that the overvoltage has occurred in the voltage of the voltage line L1, in a case where the voltage Vout1 detected by the output voltage sensor 12 exceeds a threshold voltage that is set higher than the target voltage Vtarget. The determination circuitry 53 may confirm, on the basis of the duty ratio DR detected by the duty ratio detection circuit 33, whether the so-called intermittent oscillation occurs in the DC/DC converter 30, to thereby determine whether the overvoltage is attributed to the load LD. Further, the determination circuitry 53 may calculate, as the voltage Vocal, the estimated value of the voltage V2 to be generated by the DC/DC converter 30, on the basis of the winding ratio WR of the transformer 32, the voltage Vin detected by the input voltage sensor 18, and the duty ratio DR detected by the duty ratio detection circuit 33. Thereafter, the determination circuitry 53 may determine whether the overvoltage is attributed to the DC/DC converter 30 on the basis of the calculated voltage Vocal.

Figure 10:
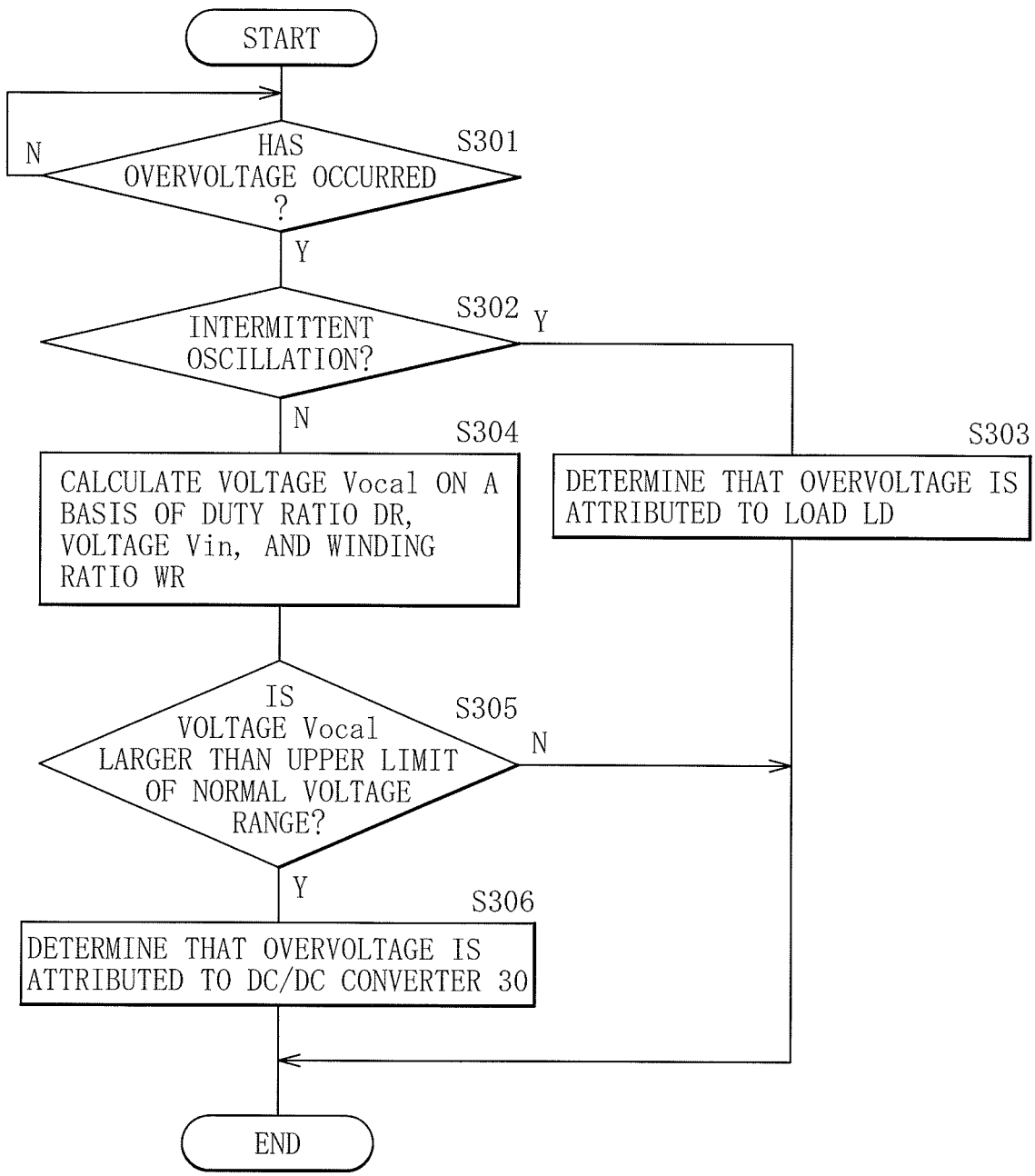
FIG. 10 is a flowchart illustrating an operation example of the power supply apparatus illustrated in FIG. 9.

FIG. 10 illustrates an example of an operation of determining a cause of the overvoltage. First, the overvoltage detection circuitry 21A included in the controller 50 may confirm whether the overvoltage has occurred in the voltage of the voltage line L1 on the basis of the voltage Vout1 detected by the output voltage sensor 12 (step S301).

In step S301, if the overvoltage detection circuitry 21A has confirmed that the overvoltage has occurred, the determination circuitry 53 included in the controller 50 may confirm whether the intermittent oscillation occurs in the DC/DC converter 30 on the basis of the duty ratio DR detected by the duty ratio detection circuit 33 (step S302).

In step S302, if the intermittent oscillation occurs in the DC/DC converter 30 ("Y" in step S302), the determination circuitry 53 may determine that the overvoltage that has occurred is attributed to the load LD (step S303). That is, in a case where the overvoltage that has occurred is attributed to the load LD, the electric current flows from the load LD to the DC/DC converter 30, for example. In such a state, the load seen from the DC/DC converter 30 is light; hence, the intermittent oscillation can occur in the DC/DC converter 30. Therefore, in a case where the intermittent oscillation occurs in the DC/DC converter 30, the determination circuitry 53 may determine that the overvoltage that has occurred is attributed to the load LD. Thereafter, the flow may be terminated.

In step S302, if the intermittent oscillation does not occur in the DC/DC converter 30 ("N" in step S302), the determination circuitry 53 may calculate the voltage Vocal, which is the estimated value of the voltage V2 to be generated by the DC/DC converter 30, on the basis of the duty ratio DR detected by the duty ratio detection circuit 33, the voltage Vin detected by the input voltage sensor 18, and the winding ratio WR of the transformer 32 (step S304).

Thereafter, the determination circuitry 53 may confirm whether the voltage Vocal is larger than an upper limit of the normal voltage range (step S305). If the voltage Vocal is not larger than the upper limit of the normal voltage range ("N" in step S305), the flow may be terminated.

In step S305, if the voltage Vocal is larger than the upper limit of the normal voltage range ("Y" in step S305), the determination circuitry 53 may determine that the overvoltage that has occurred is attributed to the DC/DC converter 30 (step S306), in the similar manner to the determination circuitry 43 according to the second example embodiment (step S208 in FIG. 7). Thereafter, the flow may be terminated.

Thereafter, the power supply apparatus 3 may notify, using the notification data INF2 for example, the external controller of data regarding which of the DC/DC converter 30 and the load LD the overvoltage that has occurred is attributed to. Thereafter, the power supply apparatus 3 may stop the operation of the switching section 11, for example. In this way, the DC/DC converter 30 may stop generating the voltage V2.

As described above, the power supply apparatus 3 differs from the power supply apparatus 2 according to the second example embodiment (FIG. 6) in that the switch 14 is omitted. In this manner, it is possible to make the configuration of the power supply apparatus 3 simple.

Further, in the power supply apparatus 3, a cause of the overvoltage is determined on the basis of whether the intermittent oscillation occurs in the DC/DC converter 30 and on the basis of the voltage Vocal which is the estimated value of the voltage V2 to be generated by the DC/DC converter 30. In one example, in the power supply apparatus 3, whether the overvoltage is attributed to the load LD is determined on the basis of whether the intermittent oscillation occurs in the DC/DC converter 30. Further, whether the overvoltage is attributed to the DC/DC converter 30 is determined on the basis of the voltage Vocal which is the estimated value of the voltage V2 to be generated by the DC/DC converter 30. In this way, in the power supply apparatus 3, it is possible to determine a cause of the overvoltage while supplying the load LD with the voltage V2 generated by the DC/DC converter 30.

As described above, the switch 14 is omitted in the third example embodiment. Therefore, it is possible to make the configuration simple.

In the third example embodiment, a cause of the overvoltage is determined on the basis of whether the intermittent oscillation occurs in the DC/DC converter and on the basis of the estimated value of the voltage to be generated by the DC/DC converter. Therefore, it is possible to determine a cause of the overvoltage while supplying the load with the voltage generated by the DC/DC converter.

Other example effects thereof are similar to the case of the second example embodiment.

Modification Example 3-1

Figure 8:
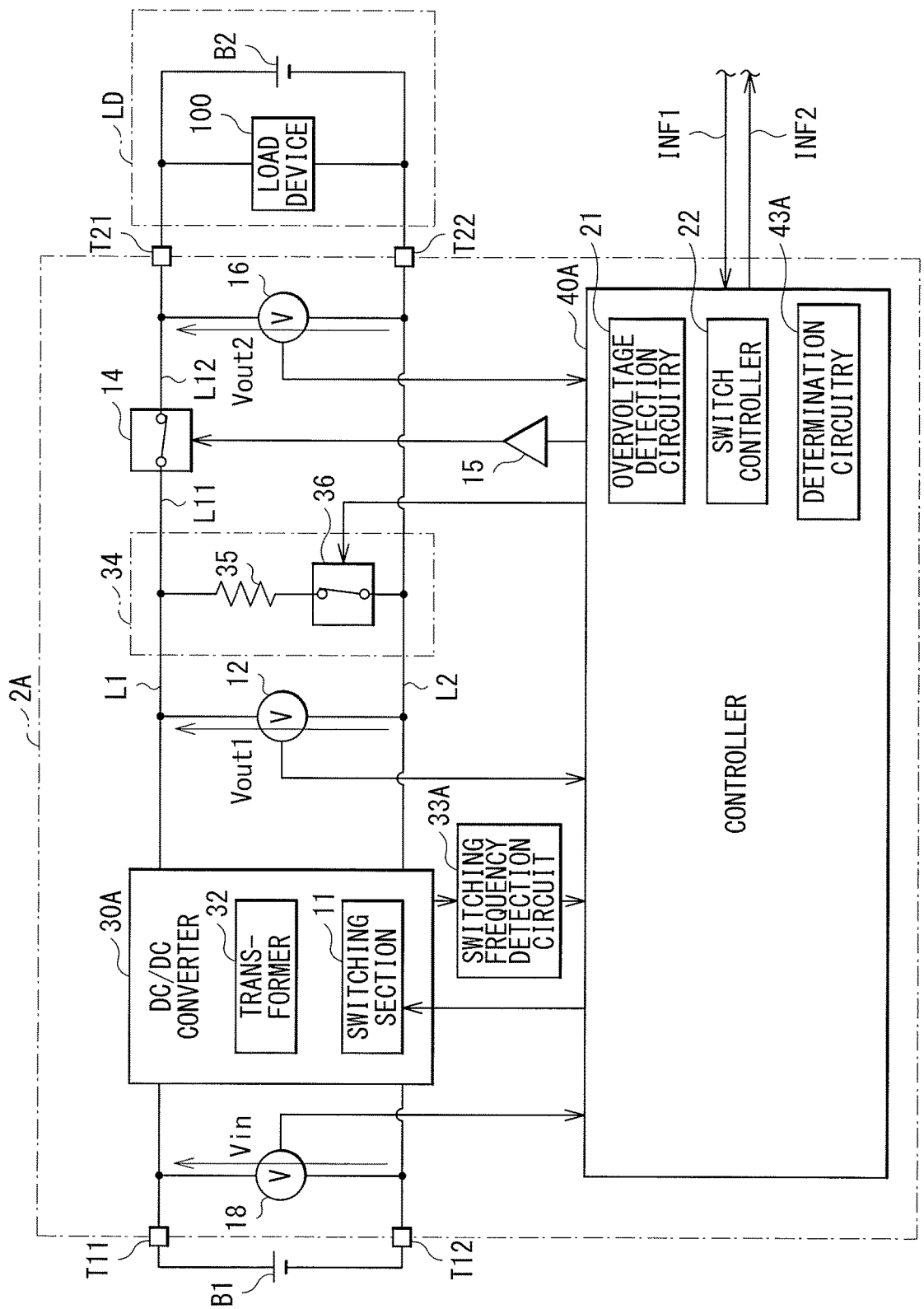
FIG. 8 is a circuit diagram illustrating a configuration example of a power supply apparatus according to a modification example of one example embodiment.
Figure 11:
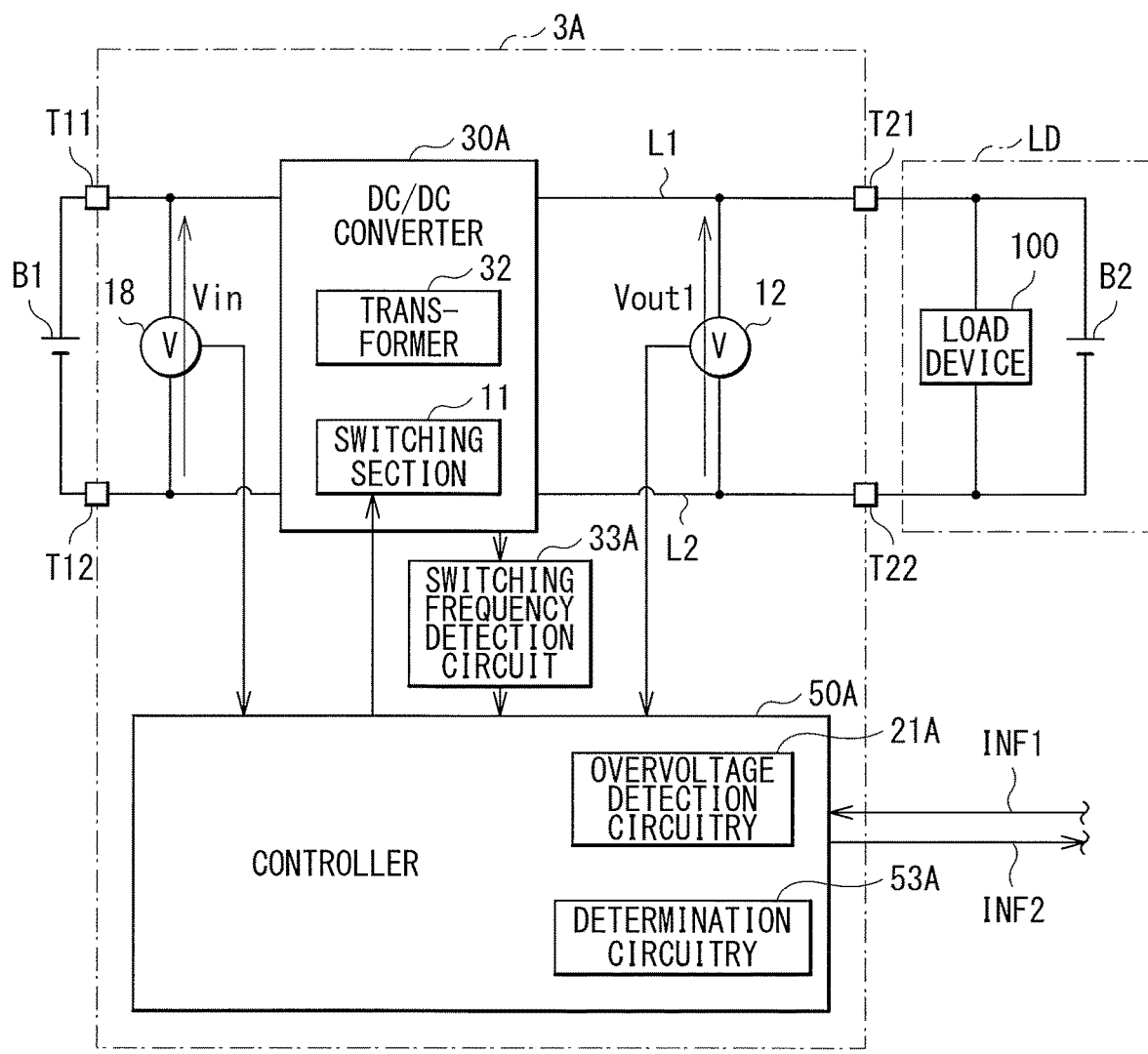
FIG. 11 is a circuit diagram illustrating a configuration example of a power supply apparatus according to a modification example of one example embodiment.

In the third example embodiment, the DC/DC converter 30 that performs the electric power conversion by the pulse width modulation is provided. However, the disclosure is not limited thereto. Alternatively, a DC/DC converter may be provided, as with a power supply apparatus 3A illustrated in FIG. 11, for example, which performs the electric power conversion with the use of the pulse frequency modulation, in the similar manner to the power supply apparatus 2A according to the modification example 2-2 of the second example embodiment (FIG. 8). The power supply apparatus 3A may include the DC/DC converter 30A, the switching frequency detection circuit 33A, and a controller 50A.

The controller 50A may include a determination circuitry 53A. The determination circuitry 53A may confirm, on the basis of the switching frequency FSW detected by the switching frequency detection circuit 33A, whether the intermittent oscillation occurs in the DC/DC converter 30A, to thereby determine whether the overvoltage is attributed to the load LD. Further, the determination circuitry 53A may calculate, as the voltage Vocal, the estimated value of the voltage V2 to be generated by the DC/DC converter 30A, on the basis of the winding ratio WR of the transformer 32, the voltage Vin detected by the input voltage sensor 18, and the switching frequency FSW detected by the switching frequency detection circuit 33A. Further, the determination circuitry 53A may determine whether the overvoltage is attributed to the DC/DC converter 30A on the basis of the calculated voltage Vocal.

Operations of determining a cause of the overvoltage in the power supply apparatus 3A are similar to the case of the power supply apparatus 3 according to the third example embodiment (FIG. 10) except step S304. In step S304, the determination circuitry 53A of the power supply apparatus 3A may calculate the voltage Vocal, which is the estimated value of the voltage V2 to be generated by the DC/DC converter 30A, on the basis of the switching frequency FSW detected by the switching frequency detection circuit 33A, the voltage Vin detected by the input voltage sensor 18, and the winding ratio WR of the transformer 32.

4. Fourth Example Embodiment

Next, description is given of a power supply apparatus 4 according to a fourth example embodiment. The power supply apparatus 4 does not include the switch 14, and configured to, while supplying the load LD with the voltage V2 generated by the DC/DC converter, determine a cause of the overvoltage on the basis of an output electric current outputted from the DC/DC converter. It is to be noted that components that are substantially the same as the components included in the power supply apparatus 3 according to the third example embodiment are denoted with the same reference numerals, and any redundant description will be omitted as appropriate.

Figure 12:
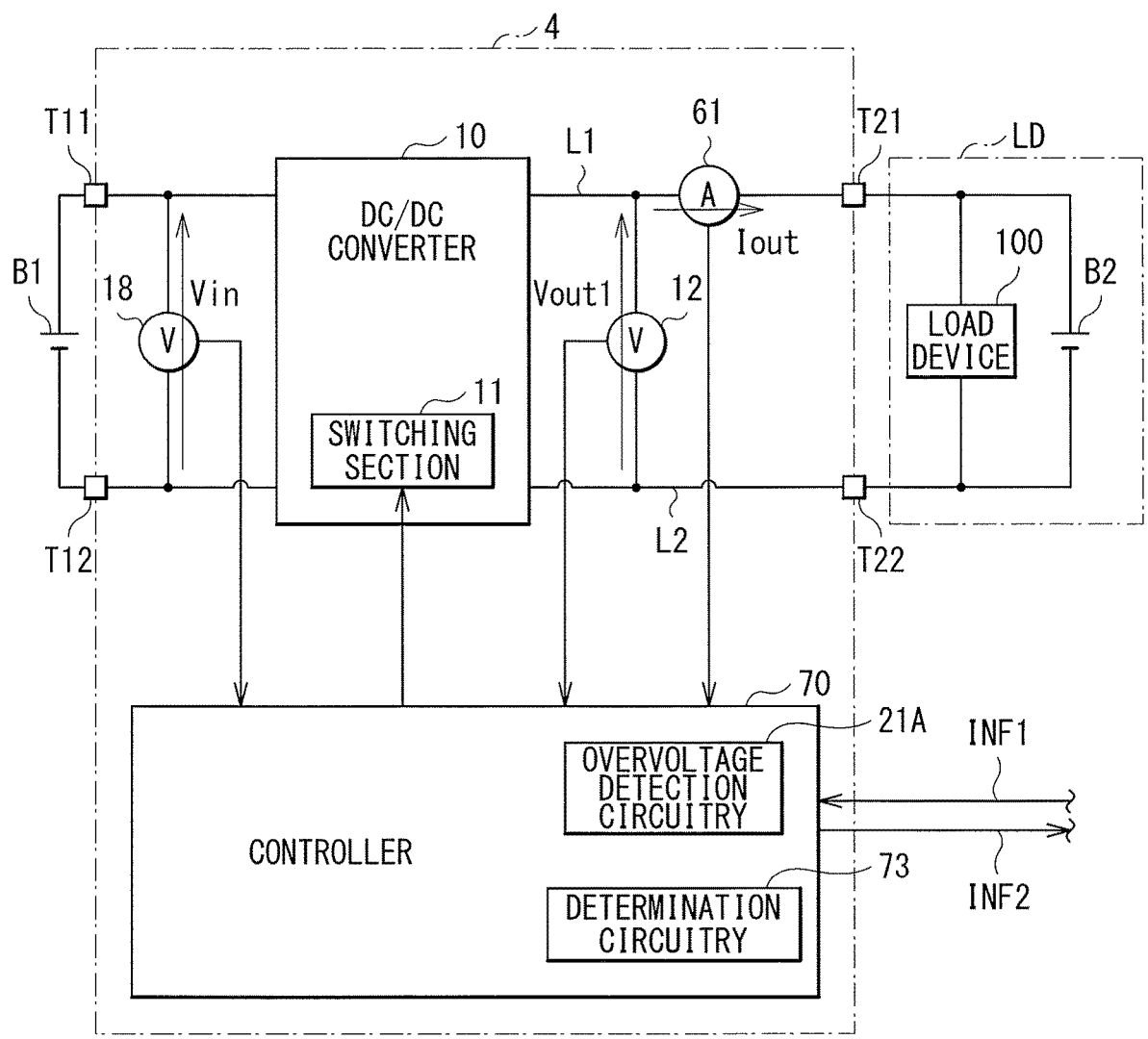
FIG. 12 is a circuit diagram illustrating a configuration example of a power supply apparatus according to one example embodiment.

FIG. 12 illustrates a configuration example of the power supply apparatus 4. The power supply apparatus 4 may include the input voltage sensor 18, the DC/DC converter 10, the output voltage sensor 12, an output electric current sensor 61, and a controller 70.

The output electric current sensor 61 may be configured to detect an output electric current that is outputted from the DC/DC converter 10 and flows through the voltage line L1. One end of the output electric current sensor 61 may be coupled to the DC/DC converter 10, and the other end of the output electric current sensor 61 may be coupled to the terminal T21. The output electric current sensor 61 may detect, as an electric current Tout, the electric current that flows from the DC/DC converter 10 to the terminal T21. Thereafter, the output electric current sensor 61 may supply the controller 70 with a voltage corresponding to the detected electric current Tout.

The controller 70 may include a determination circuitry 73. The determination circuitry 73 may determine a cause of the overvoltage on the basis of the electric current Tout detected by the output electric current sensor 61.

Figure 13:
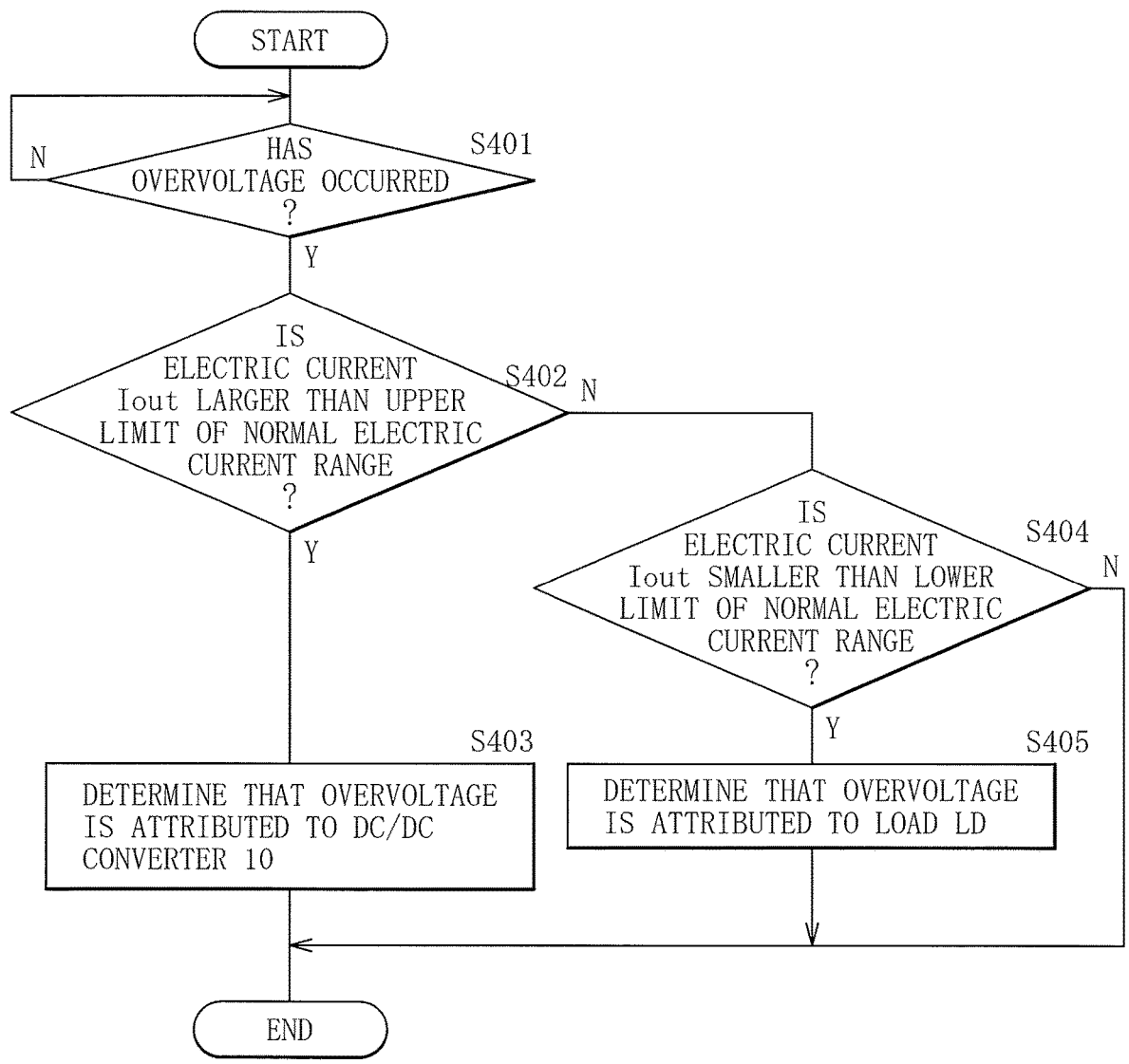
FIG. 13 is a flowchart illustrating an operation example of the power supply apparatus illustrated in FIG. 12.

FIG. 13 illustrates an example of an operation of determining a cause of the overvoltage. First, the overvoltage detection circuitry 21A included in the controller 70 may confirm whether the overvoltage has occurred in the voltage of the voltage line L1 on the basis of the voltage Vout1 detected by the output voltage sensor 12 (step S401).

In step S401, if the overvoltage detection circuitry 21A has confirmed that the overvoltage has occurred, the determination circuitry 73 included in the controller 70 may confirm whether the electric current Iout detected by the output electric current sensor 61 is larger than an upper limit of a predetermined normal electric current range (step S402). The normal electric current range may be an output electric current range of the DC/DC converter 10, where an overcurrent does not occur in the power supply apparatus 4. The upper limit of the normal electric current range is a threshold value for determining whether the overvoltage is attributed to the DC/DC converter 10, and a lower limit of the normal electric current range is a threshold value for determining whether the overvoltage is attributed to the load LD.

In step S402, if the electric current Iout is larger than the upper limit of the predetermined normal electric current range ("Y" in step S402), the determination circuitry 73 may determine that the overvoltage that has occurred is attributed to the DC/DC converter 10 (step S403), and the flow may be terminated.

In step S402, if the electric current Iout is not larger than the upper limit of the predetermined normal electric current range ("N" in step S402), the determination circuitry 73 may confirm whether the electric current Iout is smaller than the lower limit of the predetermined normal electric current range (step S404). If the electric current Iout is not smaller than the lower limit of the predetermined normal electric current range ("N" in step S404), the flow may be terminated.

In step S404, if the electric current Iout is smaller than the lower limit of the predetermined normal electric current range ("Y" in step S404), the determination circuitry 73 may determine that the overvoltage that has occurred is attributed to the load LD (step S405), and the flow may be terminated.

Thereafter, the power supply apparatus 4 may notify, using the notification data INF2 for example, the external controller of data regarding which of the DC/DC converter 10 and the load LD the overvoltage that has occurred is attributed to. Thereafter, the power supply apparatus 4 may stop the operation of the switching section 11, for example. In this way, the DC/DC converter 10 may stop generating the voltage V2.

As described above, unlike the power supply apparatus 3 according to the third example embodiment (FIG. 9), a cause of the overvoltage is determined on the basis of the output electric current outputted from the DC/DC converter 10 in the power supply apparatus 4, making it possible to omit the duty ratio detection circuit 33. Therefore, it is possible to make the configuration of the power supply apparatus 4 simple.

As described above, in the fourth example embodiment, a cause of the overvoltage is determined on the basis of the output electric current outputted from the DC/DC converter. Therefore, it is possible to make the configuration simple. Other example effects thereof are similar to the case of the third example embodiment.

Modification Example 4-1

Figure 14:
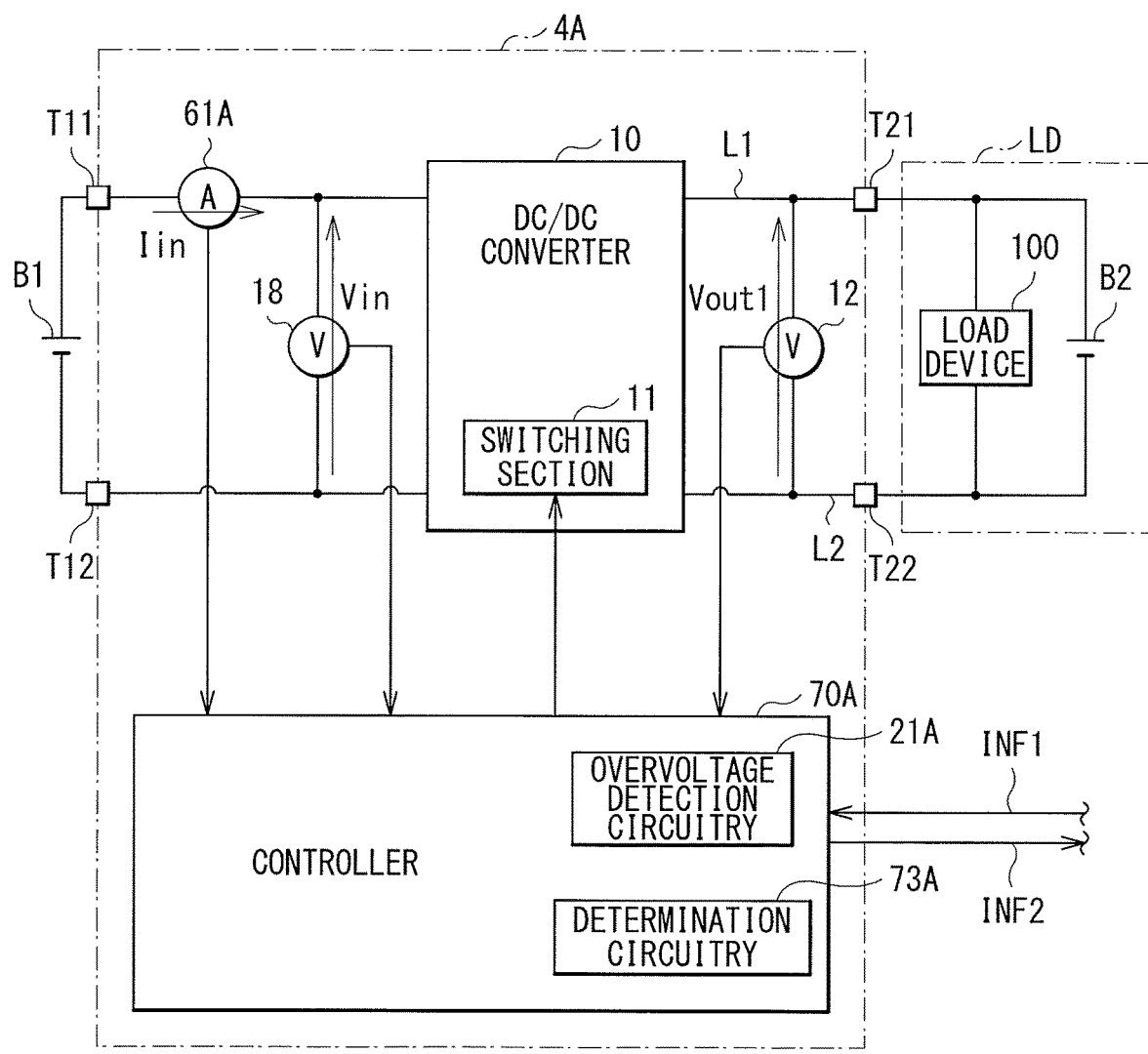
FIG. 14 is a circuit diagram illustrating a configuration example of a power supply apparatus according to a modification example of one example embodiment.

In the fourth example embodiment, a cause of the overvoltage is determined on the basis of the output electric current outputted from the DC/DC converter 10. However, the disclosure is not limited thereto. Alternatively, a cause of the overvoltage may be determined on the basis of an input electric current to be inputted to the DC/DC converter 10, as with a power supply apparatus 4A illustrated in FIG. 14, for example. The power supply apparatus 4A may include an input electric current sensor 61A and a controller 70A.

The input electric current sensor 61A may be configured to detect the input electric current to be inputted to the DC/DC converter 10. One end of the input electric current sensor 61A may be coupled to the terminal T11, and the other end of the input electric current sensor 61A may be coupled to the DC/DC converter 10. The input electric current sensor 61A may detect, as an electric current Iin, the electric current that flows from the terminal T11 to the DC/DC converter 10. Thereafter, the input electric current sensor 61A may supply the controller 70A with a voltage corresponding to the detected electric current Iin.

The controller 70A may include a determination circuitry 73A. The determination circuitry 73A may determine a cause of the overvoltage on the basis of the electric current Iin detected by the input electric current sensor 61A.

Operations of determining a cause of the overvoltage in the power supply apparatus 4A are similar to the case of the power supply apparatus 4 according to the fourth example embodiment (FIG. 13) except steps S402 and S403. In step S402, the determination circuitry 73A of the power supply apparatus 4A may confirm whether the electric current Iin detected by the input electric current sensor 61A is larger than an upper limit of a predetermined normal electric current range. The normal electric current range may be an input electric current range of the DC/DC converter 10, where an overcurrent does not occur in the power supply apparatus 4A. The upper limit of the normal electric current range is a threshold value for determining whether the overvoltage is attributed to the DC/DC converter 10, and a lower limit of the normal electric current range is a threshold value for determining whether the overvoltage is attributed to the load LD. Further, in step S404, the determination circuitry 73A may confirm whether the electric current Iin is smaller than the lower limit of the predetermined normal electric current range.

The disclosure has been described above with reference to example embodiments and modification examples. However, the disclosure is not limited thereto and may be variously modified.

For example, although the power supply apparatuses 1 to 4 each include the DC/DC converter in the example embodiments and modification examples described above, the disclosure is not limited thereto. Instead of the DC/DC converter, the power supply apparatuses 1 to 4 may each include another electric power conversion circuit such as an alternating current to direct current (AC/DC) converter, for example.

Moreover, the disclosure encompasses any possible combination of some or all of the various embodiments and the modification examples described herein and incorporated herein.

It is possible to achieve at least the following configurations from the above-described example embodiments of the disclosure.

(1) A determination circuit including:

a detection circuitry configured to detect that an overvoltage has occurred in an electric power supply path that couples an electric power conversion circuit and a load, the electric power conversion circuit being configured to generate a direct-current voltage;

a switch controller configured to turn off a switch when the detection circuitry has detected that the overvoltage has occurred, the switch being provided on the electric power supply path; and a determination circuitry configured to perform a determination operation including determining whether the overvoltage that has occurred is attributed to the electric power conversion circuit or the load, on a basis of one of or both a first voltage of a first path and a second voltage of a second path that are in a period in which the switch is off, the first path coupling the switch and the electric power conversion circuit in the electric power supply path, the second path coupling the switch and the load in the electric power supply path.

(2) The determination circuit according to (1), in which
the determination circuitry is configured to perform the determination operation on a basis of the second voltage, and
the determination operation includes, when the second voltage is within a predetermined voltage range, determining that the overvoltage that has occurred is attributed to the electric power conversion circuit, and, when the second voltage is larger than an upper limit of the predetermined voltage range, determining that the overvoltage that has occurred is attributed to the load.

(3) The determination circuit according to (2), in which the second voltage is configured to be detected by a voltage sensor coupled to the second path.

(4) The determination circuit according to (1), in which
the determination circuitry is configured to perform the determination operation on a basis of the first voltage, and
the determination operation includes, when the first voltage is within a predetermined voltage range, determining that the overvoltage that has occurred is attributed to the load, and, when the first voltage is larger than an upper limit of the predetermined voltage range, determining that the overvoltage that has occurred is attributed to the electric power conversion circuit.

(5) The determination circuit according to (4), in which
the electric power conversion circuit includes a switching section configured to perform a switching operation, and
the determination circuitry is configured to calculate the first voltage on a basis of the switching operation.

(6) The determination circuit according to (5), in which
the electric power conversion circuit is configured to convert an input direct-current voltage into the direct-current voltage by a pulse width modulation, and
the determination circuitry is configured to calculate the first voltage on a basis of a duty ratio of the switching operation.

(7) The determination circuit according to (6), in which the determination circuitry is configured to calculate the first voltage on a basis of the duty ratio of the switching operation where a load circuit is enabled, the load circuit being coupled to the first path and being configured to be enabled or disabled.

(8) A power supply apparatus including:
the determination circuit according to any one of (1) to (7);
the electric power conversion circuit; and
the switch.

(9) A power supply apparatus including:
an electric power conversion circuit configured to generate a direct-current voltage, and including a switching section configured to perform a switching operation;

a detection circuitry configured to detect that an overvoltage has occurred in an electric power supply path that couples the electric power conversion circuit and a load; and a determination circuitry configured to perform, when the detection circuitry has detected that the overvoltage has occurred, a determination operation including determining whether the overvoltage that has occurred is attributed to the electric power conversion circuit or the load, on a basis of the switching operation.

(10) The power supply apparatus according to (9), in which
the determination circuitry is configured to calculate a voltage of the electric power supply path on a basis of the switching operation, and detect an intermittent oscillation of the electric power conversion circuit on a basis of the switching operation, and
the determination operation includes, when the voltage calculated by the determination circuitry is larger than an upper limit of a predetermined voltage range, determining that the overvoltage that has occurred is attributed to the electric power conversion circuit, and, when the intermittent oscillation is detected by the determination circuitry, determining that the overvoltage that has occurred is attributed to the load.

(11) A power supply apparatus including:
an electric power conversion circuit configured to generate a direct-current voltage, and including a switching section configured to perform a switching operation;
a detection circuitry configured to detect that an overvoltage has occurred in an electric power supply path that couples the electric power conversion circuit and a load; and
a determination circuitry configured to perform, when the detection circuitry has detected that the overvoltage has occurred, a determination operation including determining whether the overvoltage that has occurred is attributed to the electric power conversion circuit or the load, on a basis of an input electric current to be inputted to the electric power conversion circuit or an output electric current outputted from the electric power conversion circuit.

(12) The power supply apparatus according to (11), in which
the determination circuitry is configured to perform the determination operation on a basis of the output electric current, and
the determination operation includes, when the output electric current is larger than an upper limit of a predetermined electric current range, determining that the overvoltage that has occurred is attributed to the electric power conversion circuit, and, when the output electric current is smaller than a lower limit of the predetermined electric current range, determining that the overvoltage that has occurred is attributed to the load.

According to the determination circuit and the power supply apparatus in one embodiment of the disclosure, the determination operation is performed on the basis of one of or both the first voltage and the second voltage, while the switch is off. Therefore, it is possible to easily perform the malfunction analysis.

According to the power supply apparatus in one embodiment of the disclosure, the determination operation is performed on the basis of the switching operation. Therefore, it is possible to easily perform the malfunction analysis.

According to the power supply apparatus in one embodiment of the disclosure, the determination operation is performed on the basis of the input electric current to be inputted to the electric power conversion circuit or the output electric current outputted from the electric power conversion circuit. Therefore, it is possible to easily perform the malfunction analysis.

Although the disclosure has been described in terms of exemplary embodiments, it is not limited thereto. It should be appreciated that variations may be made in the described embodiments by persons skilled in the art without departing from the scope of the disclosure as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" as used herein can allow for a degree of variability in a value or range. The term "disposed above/provided above/formed above" and its variants as used herein refer to elements disposed directly in contact with each other or indirectly by having intervening structures therebetween. The term "disposed on/provided on/formed on" and its variants as used herein refer to elements disposed directly in contact with each other or indirectly by having intervening structures therebetween. Moreover, no element or component in this disclosure is intended to be dedicated to the public regardless of whether the element or component is explicitly recited in the following claims.

What is claimed is:

1. A controller comprising:
a detection circuit configured to detect that an overvoltage has occurred in an electric power supply path that couples an electric power conversion circuit and a load, the electric power conversion circuit being configured to generate a direct-current voltage;
a switch controller configured to turn off a switch when the detection circuit has detected that the overvoltage has occurred, the switch being provided on the electric power supply path; and
a determination circuit configured to perform a determination operation including determining whether the overvoltage that has occurred is attributable to the electric power conversion circuit or the load, on a basis of one of or both a first voltage of a first path and a second voltage of a second path that are measured in a period in which the overvoltage has occurred and the switch is off, the first path coupling the switch and the electric power conversion circuit in the electric power supply path, the second path coupling the switch and the load in the electric power supply path.

2. The controller according to claim 1, wherein
the determination circuit is configured to perform the determination operation on a basis of the second voltage, and
the determination operation includes, when the second voltage is within a predetermined voltage range, determining that the overvoltage that has occurred is attributable to the electric power conversion circuit, and, when the second voltage is larger than an upper limit of the predetermined voltage range, determining that the overvoltage that has occurred is attributable to the load.

3. The controller according to claim 2, wherein the second voltage is configured to be detected by a voltage sensor coupled to the second path.

4. The controller according to claim 1, wherein
the determination circuit is configured to perform the determination operation on a basis of the first voltage, and
the determination operation includes, when the first voltage is within a predetermined voltage range, determining that the overvoltage that has occurred is attributable to the load, and, when the first voltage is larger than an upper limit of the predetermined voltage range, determining that the overvoltage that has occurred is attributable to the electric power conversion circuit.

5. The controller according to claim 4, wherein
the electric power conversion circuit includes a switching section configured to perform a switching operation, and
the determination circuit is configured to calculate the first voltage on a basis of the switching operation.

6. The controller according to claim 5, wherein
the electric power conversion circuit is configured to convert an input direct-current voltage into the direct-current voltage by a pulse width modulation, and
the determination circuit is configured to calculate the first voltage on a basis of a duty ratio of the switching operation.

7. The controller according to claim 6, wherein
the determination circuit is configured to calculate the first voltage on the basis of the duty ratio of the switching operation where a load circuit is enabled, the load circuit being coupled to the first path and being configured to be enabled or disabled.

8. A power supply apparatus comprising:
the controller according to claim 1;
the electric power conversion circuit; and
the switch.

9. A power supply apparatus comprising:
an electric power conversion circuit configured to generate a direct-current voltage, and including a switching section configured to perform a switching operation;
a detection circuit configured to detect that an overvoltage has occurred in an electric power supply path that couples the electric power conversion circuit and a load; and
a determination circuit configured to perform, when the detection circuit has detected that the overvoltage has occurred, a determination operation including determining whether the overvoltage that has occurred is attributable to the electric power conversion circuit or the load, on a basis of the switching operation, wherein
the determination circuit is configured to calculate a voltage of the electric power supply path on the basis of the switching operation, and detect an intermittent oscillation of the electric power conversion circuit on the basis of the switching operation, and
the determination operation includes, when the voltage calculated by the determination circuit is larger than an upper limit of a predetermined voltage range, determining that the overvoltage that has occurred is attributable to the electric power conversion circuit, and, when the intermittent oscillation is detected by the determination circuit, determining that the overvoltage that has occurred is attributable to the load.

10. A power supply apparatus comprising:
an electric power conversion circuit configured to generate a direct-current voltage, and including a switching section configured to perform a switching operation;

a detection circuit configured to detect that an overvoltage has occurred in an electric power supply path that couples the electric power conversion circuit and a load; and a determination circuit configured to perform, when the detection circuit has detected that the overvoltage has occurred, a determination operation including determining whether the overvoltage that has occurred is attributable to the electric power conversion circuit or the load, on a basis of an input electric current to be inputted to the electric power conversion circuit or an output electric current outputted from the electric power conversion circuit, the determination operation includes, when the output electric current is larger than an upper limit of a predetermined electric current range, determining that the overvoltage that has occurred is attributable to the electric power conversion circuit, and, when the output electric current is smaller than a lower limit of the predetermined electric current range, determining that the overvoltage that has occurred is attributable to the load, and the predetermined electric current range comprises an output electric current range of the electric power conversion circuit where an overcurrent does not occur.

11. A power supply apparatus comprising:

an electric power conversion circuit configured to generate a direct-current voltage, and including a switching section configured to perform a switching operation;

a detection circuit configured to detect that an overvoltage has occurred in an electric power supply path that couples the electric power conversion circuit and a load; and a determination circuit configured to perform, when the detection circuit has detected that the overvoltage has occurred, a determination operation including determining whether the overvoltage that has occurred is attributable to the electric power conversion circuit or the load, on a basis of an input electric current to be inputted to the electric power conversion circuit, wherein the determination operation includes, when the input electric current is larger than an upper limit of a predetermined electric current range, determining that the overvoltage that has occurred is attributable to the electric power conversion circuit, and, when the input electric current is smaller than a lower limit of the predetermined electric current range, determining that the overvoltage that has occurred is attributable to the load.

* * * * *